(12) United States Patent
Bonora et al.

(10) Patent No.: US 10,514,773 B2
(45) Date of Patent: Dec. 24, 2019

(54) FOOT-OPERATED CONTROLLER, DEVICE AND FURNITURE COMPRISING IT, METHOD OF OPERATING IT

(71) Applicant: 3DRUDDER, Marseilles (FR)

(72) Inventors: Valerio Bonora, Marseilles (FR); Stanislas Chesnais, Le Vesinet (FR); Sylvain Leclercq, Marseilles (FR); Emmanuel Fromy, Bouc Bel Air (FR)

(73) Assignee: 3DRUDDER (FR)

( * ) Notice: Subject to any disclaimer, the term of this patent is extended or adjusted under 35 U.S.C. 154(b) by 0 days.

(21) Appl. No.: 15/127,552

(22) PCT Filed: Sep. 16, 2015

(86) PCT No.: PCT/IB2015/002013
§ 371 (c)(1),
(2) Date: Sep. 20, 2016

(87) PCT Pub. No.: WO2016/042407
PCT Pub. Date: Mar. 24, 2016

(65) Prior Publication Data
US 2017/0185168 A1 Jun. 29, 2017

Related U.S. Application Data

(60) Provisional application No. 62/105,230, filed on Jan. 20, 2015, provisional application No. 62/050,780, filed on Sep. 16, 2014.

(51) Int. Cl.
*G06F 3/033* (2013.01)
*G06F 3/01* (2006.01)
(Continued)

(52) U.S. Cl.
CPC .......... *G06F 3/0334* (2013.01); *A63F 13/211* (2014.09); *A63F 13/214* (2014.09);
(Continued)

(58) Field of Classification Search
CPC ...... G06F 3/0334; G06F 3/011; A63F 13/211; A63F 13/214; A63F 13/218; A63F 13/22; A63F 13/428
See application file for complete search history.

(56) References Cited

U.S. PATENT DOCUMENTS 5,864,333 A    1/1999   O'Heir
2003/0047979 A1*   3/2003   Carom .................. A47C 16/02
                                         297/423.45
(Continued)

FOREIGN PATENT DOCUMENTS

EP    2237132 A2    10/2010
GB    2504972 A    2/2014
(Continued)

OTHER PUBLICATIONS

International Search Report for Application No. PCT/IB2015/002013 dated Feb. 25, 2016.

*Primary Examiner* — Christopher E Leiby
(74) *Attorney, Agent, or Firm* — Lerner, David, Littenberg, Krumholz & Mentlik, LLP

(57) ABSTRACT

The invention concerns a foot-operated controller, comprising a top platform (1) having a top surface for receiving the feet, a bottom cup (2) having a lower surface (20) of curved convex shape for rotating (1) on its lower surface (20), wherein the top platform (1) is attached to the bottom cup (2), rotation sensors (7b) for measuring rotations of the top platform (1) about a first yaw axis (Z), a second roll axis (X) and a third pitch axis (Y). According to the invention, it comprises at least one strength sensor (6) for measuring strength applied on the top platform (1), means (7a) for generating control signals (CS) from the rotations and strength measured, means (7c) to register an initial rotation position of the platform (1) relative to at least one the axes (Z, X, Y) when the strength sensor (6) measures a strength representative of the presence of the feet, wherein the initial rotation position corresponds to a rest position of the feet on the top platform (1) when the user is sitting and to the top platform (1) inclined by at least a not null angle to the rear about the third pitch axis (Y) relative to an horizontal (Continued)

Figure 1:
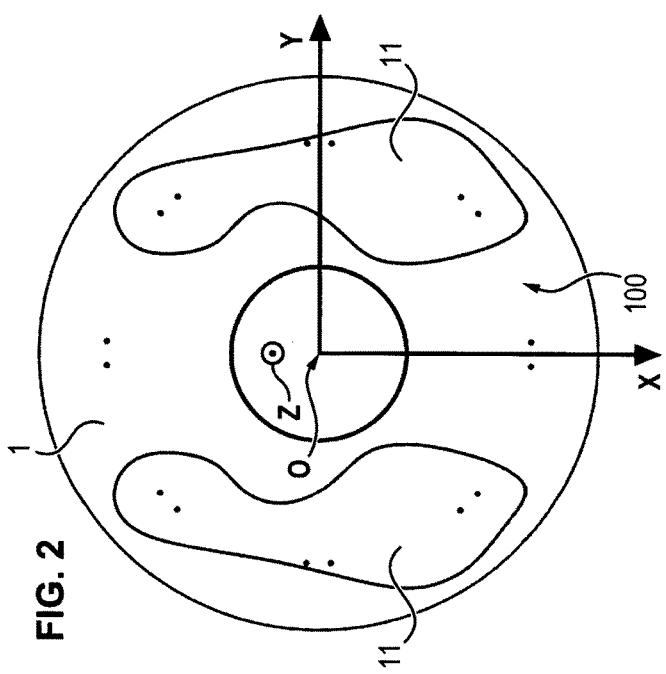
Figure 3:
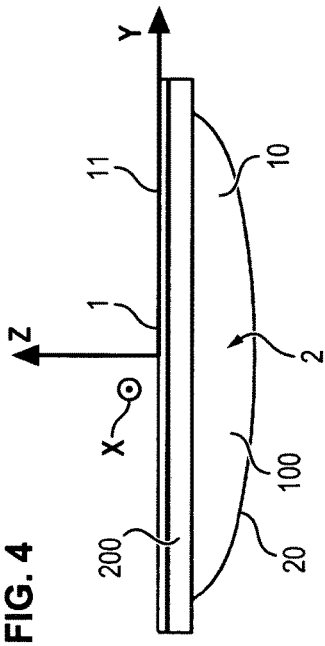

position (P0) of the platform (1), wherein the control signals (CS) are generated to take as a reference (CS0) the initial rotation position.

22 Claims, 18 Drawing Sheets

(51) Int. Cl.
    *A63F 13/428*     (2014.01)
    *A63F 13/211*     (2014.01)
    *A63F 13/22*     (2014.01)
    *A63F 13/218*     (2014.01)
    *A63F 13/214*     (2014.01)
    *G06F 3/0338*     (2013.01)
    *G06F 3/0346*     (2013.01)

(52) U.S. Cl.
    CPC ............ *A63F 13/218* (2014.09); *A63F 13/22* (2014.09); *A63F 13/428* (2014.09); *G06F 3/011* (2013.01); *G06F 3/0338* (2013.01); *G06F 3/0346* (2013.01)

(56) References Cited

U.S. PATENT DOCUMENTS

| | | | |
|---|---|---|---|
| 2005/0116825 A1* | 6/2005 | Manneschi | G01V 3/08 340/551 |
| 2012/0231883 A1* | 9/2012 | Hayashi | A63F 13/44 463/31 |
| 2013/0344926 A1 | 12/2013 | Claudel et al. | |
| 2015/0206350 A1* | 7/2015 | Gardes | G06F 3/0346 345/619 |
| 2015/0286290 A1* | 10/2015 | Turner | G06F 3/0334 345/156 |

FOREIGN PATENT DOCUMENTS

| | | |
|---|---|---|
| JP | 2009020656 A | 1/2009 |
| WO | 0057975 A1 | 10/2000 |
| WO | 2012092674 A1 | 7/2012 |
| WO | 2013086602 A1 | 6/2013 |

\* cited by examiner

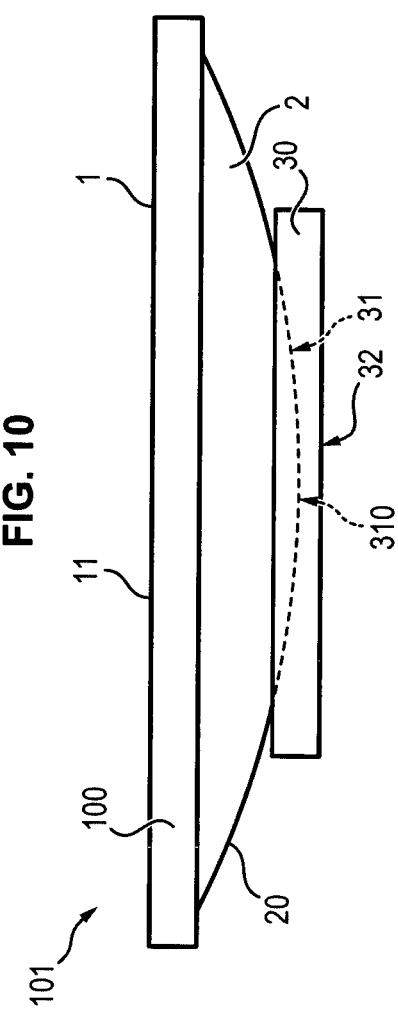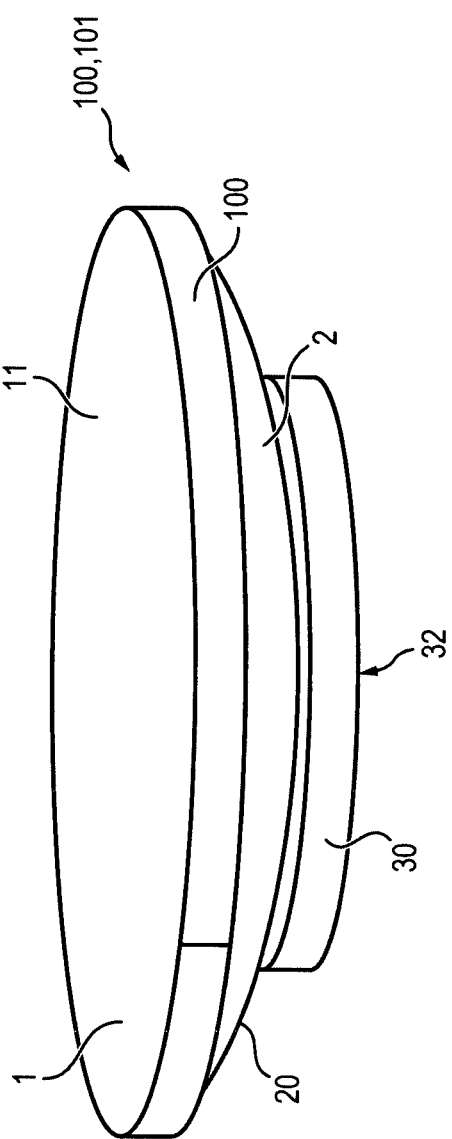

FOOT-OPERATED CONTROLLER, DEVICE AND FURNITURE COMPRISING IT, METHOD OF OPERATING IT

CROSS REFERENCE TO RELATED APPLICATIONS

The present application is a national phase entry under 35 U.S.C. § 371 of International Application No. PCT/IB2015/002013, filed Sep. 16, 2015, which claims priority from U.S. Provisional Patent Application No. 62/050,780 filed Sep. 16, 2014, and U.S. Provisional Patent Application No. 62/105,230 filed Jan. 20, 2015, the disclosures of which are incorporated by reference herein.

The invention concerns a foot-operated controller, a device having a foot-operated controller, a furniture having a foot-operated controller and a method to operate the foot-operated controller.

A field of use of the invention is controlling navigation and motion on a screen of a machine or a computer, for example for playing a video game or working with a computer, especially for moving a pointer or a point of view or an object, on a screen or in virtual environments or for remote control of a machine in the real world.

A lot of controllers are known in the state of the art, for example from documents WO 00/57975, WO 2013/086602, WO 2012/092674 and U.S. Pat. No. 5,864,333.

A major problem of foot-operated controllers is tiredness of the person. Especially, a lot of known foot-operated controllers are provided to be used by the user standing on it, which is particularly tiring for the user who has to find a balance on it.

An objective of the invention is to solve this problem and to improve the comfort of use of the controller, while allowing to operate the controller with the feet in an accurate and easy way.

For this purpose, a first subject matter according to an embodiment of the invention is a foot-operated controller, comprising a top platform having at least top surface for receiving the feet, a bottom cup having a lower surface of curved convex shape for rotating on its lower surface, wherein the top platform is attached to the bottom cup, so that the top platform carries out the same movement as the bottom cup, rotation sensors for measuring rotations of the top platform and/or of the bottom cup about a first yaw axis, a second roll axis and a third pitch axis, which are not coplanar.

According to an embodiment of the invention, the foot-operated controller further comprises at least one strength sensor for measuring strength applied on the top platform, wherein the rotation sensors and the at least one strength sensor are housed between the top platform and the bottom cup.

According to an embodiment of the invention, the foot-operated controller further comprises means for generating control signals from the rotations and strength measured by the rotation sensors and the at least one strength sensor.

According to an embodiment of the invention, the foot-operated controller further comprises means to register an initial rotation position of the top platform and/or of the bottom cup measured by the rotation sensors relative to at least one of the first yaw axis, second roll axis and third pitch axis and/or an initial force measured by the at least one strength sensor (6) when the at least one strength sensor measures a strength representative of the presence of the feet on the top platform.

According to an embodiment of the invention, the initial rotation position and/or the initial force corresponds to a rest position and/or rest force of the feet on the top platform when the user is sitting and to the top platform inclined by at least a not null angle to the rear about the third pitch axis relative to an horizontal position of the top platform.

According to an embodiment of the invention, the control signals are generated to take as a reference the initial rotation position and/or the initial force.

Thanks to the invention, the controller is adapted to be operated by the user sitting on a seat, with his feet being on the top platform of the controller to operate the latter. The controller may be situated in front of the chair or of the seat or of the furniture, on which the user is sitting. The initial rotation position and/or the initial force(s) and the angle inclined to the rear corresponds to a rest position of the feet when sitting, which then avoids tiring. The fact that the user is sitting when using the controller is much more comfortable and much less tiring for the user. Then, all the movements caused by the control signals may have a zero position, for example a position of the cursor located at the center of the screen, corresponding to the rest position and/or rest force of the feet, inclined by the angle to the rear. According to the invention, the horizontal position of the top platform may not correspond to the rest position of the feet. A zero position of the control signals which would correspond to the horizontal position of the top platform is tiring for the user, since he or she has always to exert a muscular and articular effort on his feet just to put the control signals on the zero position. On the contrary, the zero position of the control signals corresponds according to the invention to a position of the top platform inclined to the rear relative to the horizontal position of the top platform and to the rest position of the feet, in which the user has the less muscular and articular effort to exert on his feet. Then the invention is much less tiring and much more comfortable for the user, especially when repeating quick movements. The user experiences better control because of the control signals taking as reference the rest position of his or her feet on the controller. The initial rotation position and/or initial force corresponding to the rest position and/or to the rest force may be registered at each new start of the controller, during an initialization step, which may be quickly carried out (often taking one second of time or less). Then the control signals are submitted to a calibration on the initial rotation position caused by the feet of the user during the initialization step and/or initial force caused by the feet of the user during the initialization step.

According to an embodiment of the invention, the angle of the top platform to the rear under the horizontal position about the third pitch axis is strictly greater than 0° and lower than or equal to 20°.

According to an embodiment of the invention, the top surface has a left engraved footprint and/or a right engraved footprint.

The left engraved footprint and/or the right engraved footprint are optional.

According to an embodiment of the invention, the at least one strength sensor is located under the left engraved footprint and/or the right engraved footprint.

According to an embodiment of the invention, the at least one strength sensor comprises a first strength sensor and a second strength sensor placed under respectively a first point of the top platform and a second point of the top platform distant from the first point along the second roll axis.

According to an embodiment of the invention, the at least one strength sensor comprises at least a further strength sensor placed under a further point of the top platform, which is distant from the first point and from the second point.

According to an embodiment of the invention, the at least one strength sensor comprises a third strength sensor and a fourth strength sensor placed under respectively a third point of the top platform and a fourth point of the top platform distant from the third point along the third pitch axis.

According to an embodiment of the invention, the at least one strength sensor comprises a plurality of strength sensors distributed around a vertical axis under the top platform under respectively a plurality of points of the top platform, wherein the distance between the points is smaller than the size of an adult foot.

According to an embodiment of the invention, the distance between the points is smaller than 30 cm.

According to an embodiment of the invention, the lower surface of the bottom cup is of revolution around a vertical axis.

According to an embodiment of the invention, the lower surface of the bottom cup has an outer antiskid surface for preventing the bottom cup to slide.

According to an embodiment of the invention, the initial rotation position and/or the initial force and/or the rest position and/or the rest force and/or the reference and/or the not null angle corresponds to an immobile position of a physical or virtual object, a moving of which from the immobile position is driven by the control signals or a speed of which from the immobile position is driven by the control signals.

According to an embodiment of the invention, the foot-operated controller comprises means to determine the second roll axis and/or the third pitch axis from the initial rotation position having been registered and corresponding to the not null angle to the rear, having been measured by the rotation sensors.

Another subject matter of the invention is a device comprising the foot-operated controller as described above, characterized in that the device further comprises a lower base separated from the bottom cup and provided for supporting the bottom cup and for allowing rotations of the bottom cup about the first yaw axis, the second roll axis and the third pitch axis. This subject matter is optional.

According to an embodiment of the invention, the lower base has an upper recess for receiving the bottom cup.

According to an embodiment of the invention, the lower base has an upper surface for receiving the bottom cup and for allowing the bottom cup to slide on the lower base and/or the lower surface of the bottom cup has a surface for allowing the bottom cup to slide on the lower base.

According to an embodiment of the invention, the lower base has an outer bottom antiskid surface for preventing the lower base to slide.

Another subject matter of the invention is a furniture, comprising a seat attached to a lower base situated lower than the seat, and the foot-operated controller as described above, wherein the lower base is separated from the bottom cup of the foot-operated controller and is provided for supporting the bottom cup and for allowing rotations of the bottom cup about the first yaw axis, the second roll axis and the third pitch axis.

Another subject matter of the invention is a method of operating the foot-operated controller as described above or the device as described above, characterized in that in a first step, a user puts his two feet on the top platform of the foot-operated controller, in a second step, the at least one strength sensor measures a strength exerted on the top platform, in a third initialization step, an initial rotation position of the top platform and/or of the bottom cup relative to at least one of the first yaw axis, second roll axis and third pitch axis is measured by the rotation sensors and/or an initial force is measured by the at least one strength sensor, in response to the fact that the strength measured in the second step by the at least one strength sensor is representative of the presence of the feet on the top platform, wherein the initial rotation position and/or the initial force corresponds to a rest position and/or rest force of the feet on the top platform when the user is sitting and to the top platform inclined by a not null angle to the rear about the third pitch axis relative to an horizontal position of the top platform, in a fourth step after the third initialization step, the at least one strength sensor measures a strength exerted on the top platform and the rotation sensors measure rotations of the top platform and/or of the bottom cup about the first yaw axis, the second roll axis and the third pitch axis, so that the control signals are generated depending of the strength and rotations measured during the fourth step to have as a reference the initial rotation position and/or the initial force.

Figure 5:
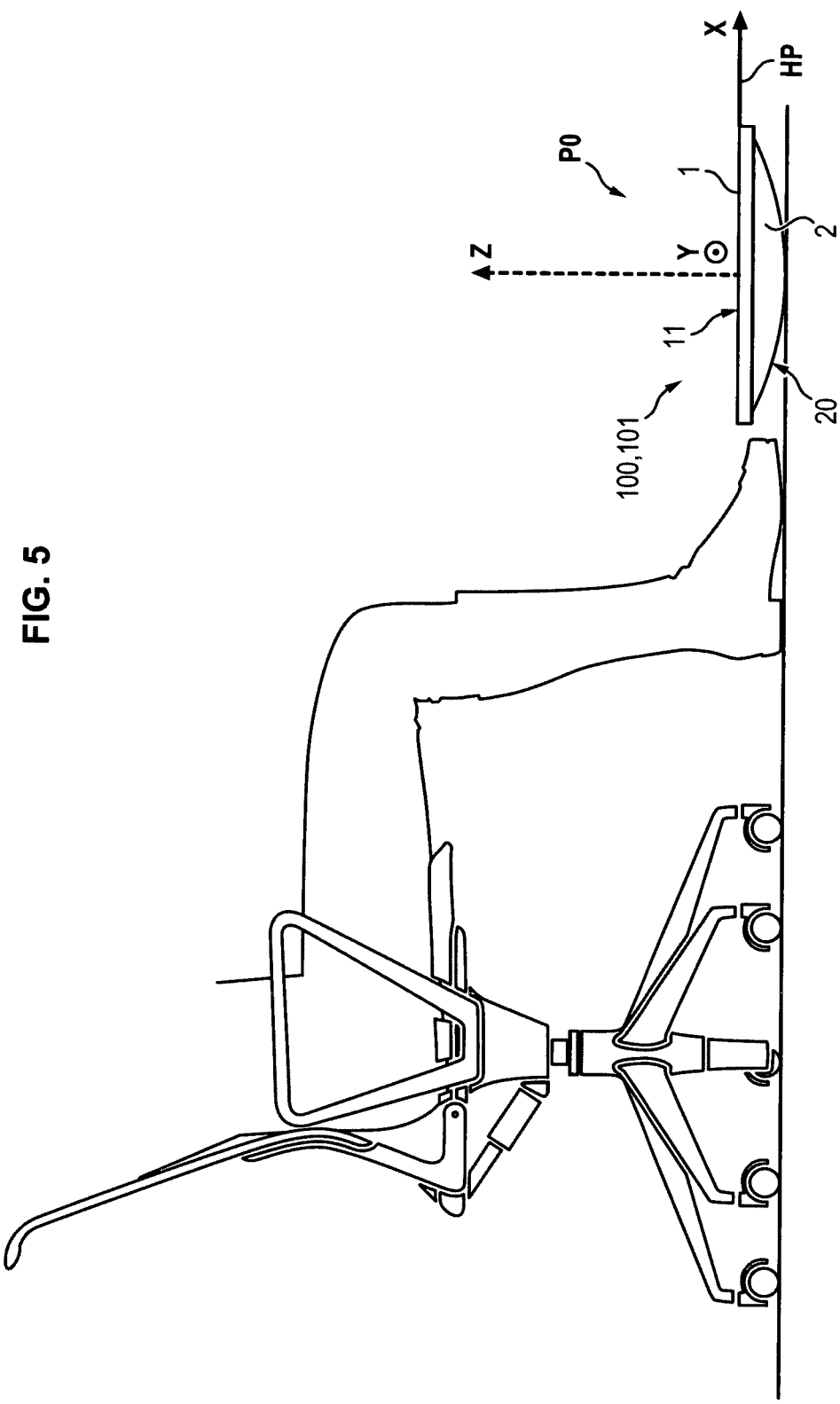
Figure 6:
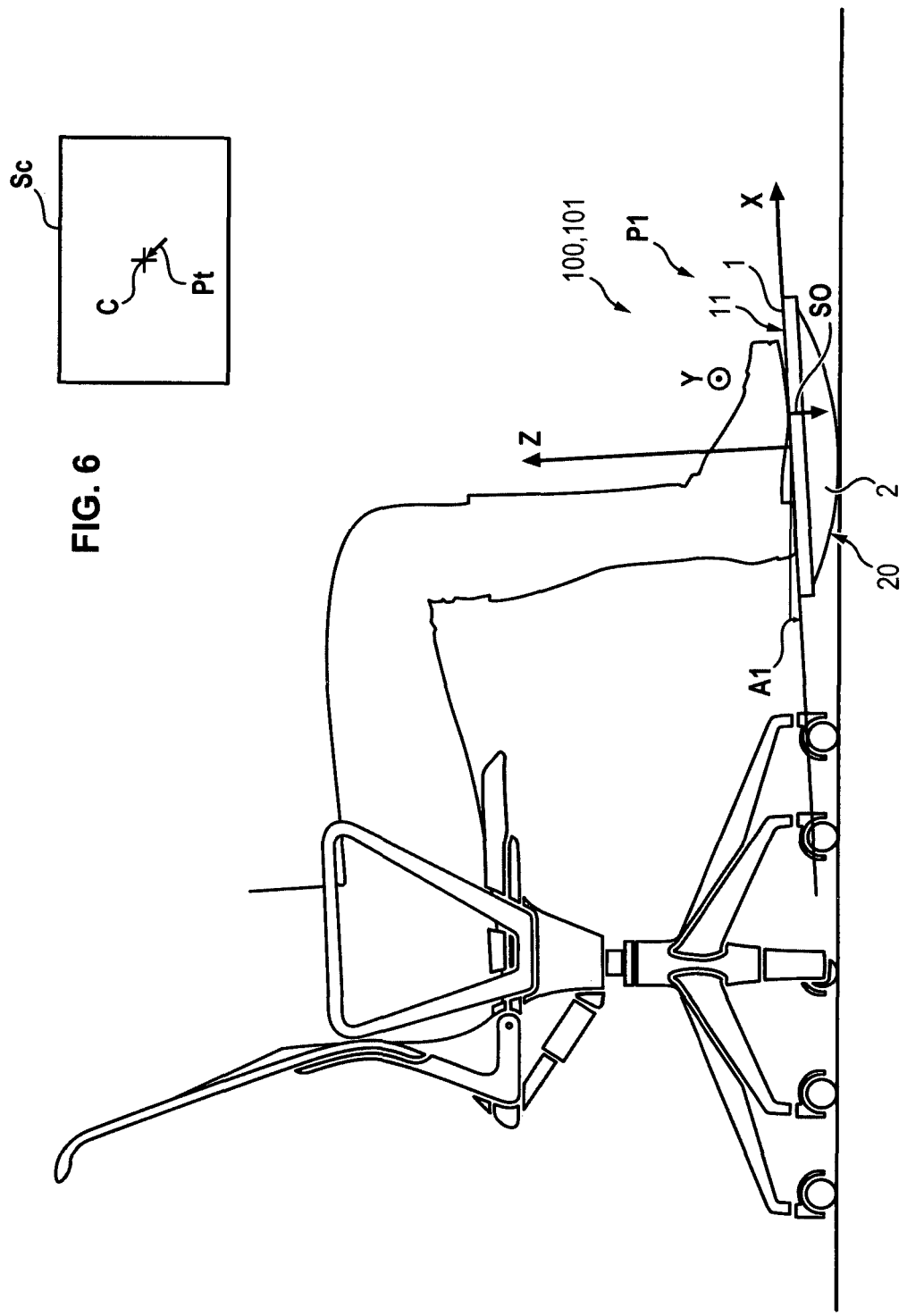
Figure 7:
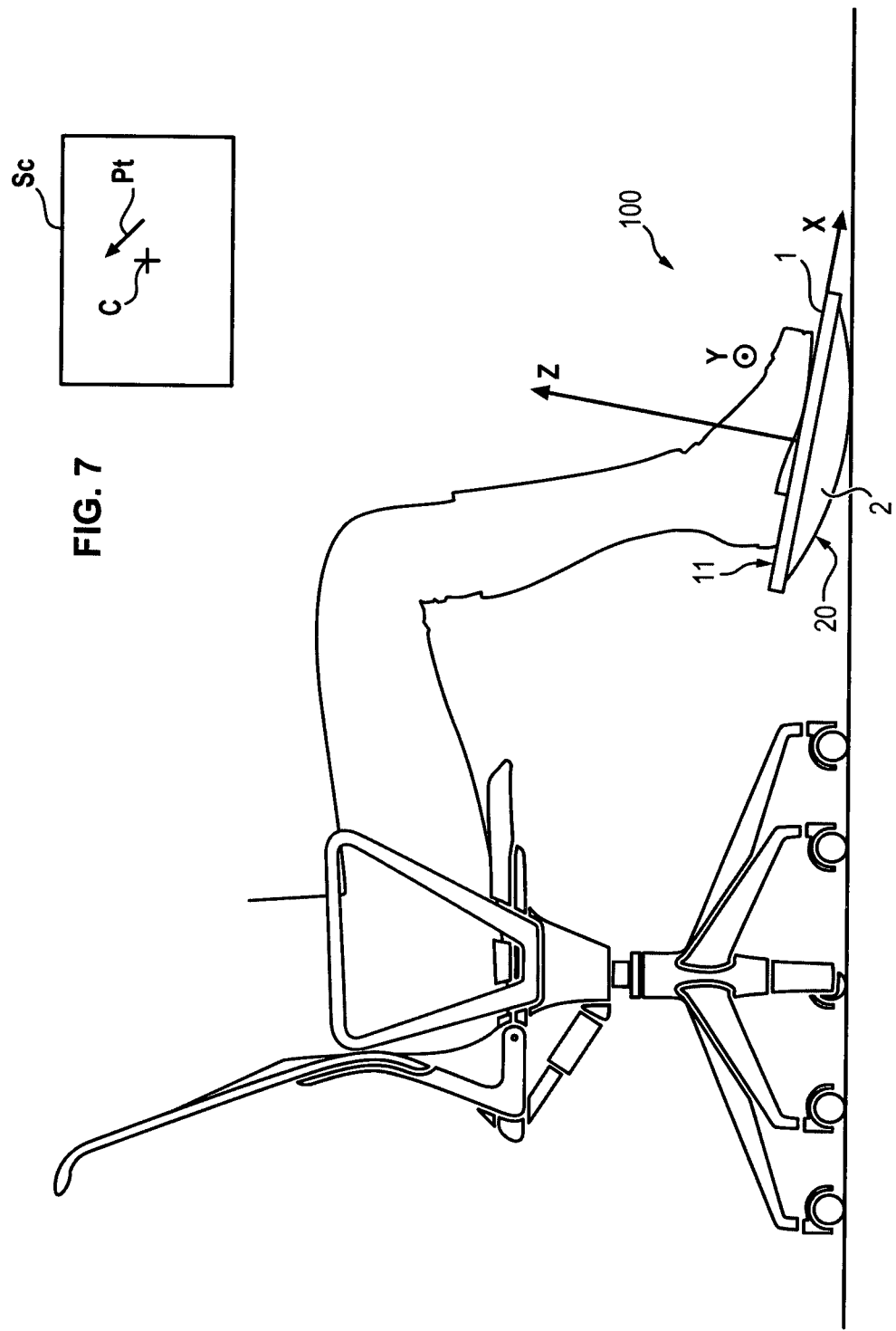
Figure 8:
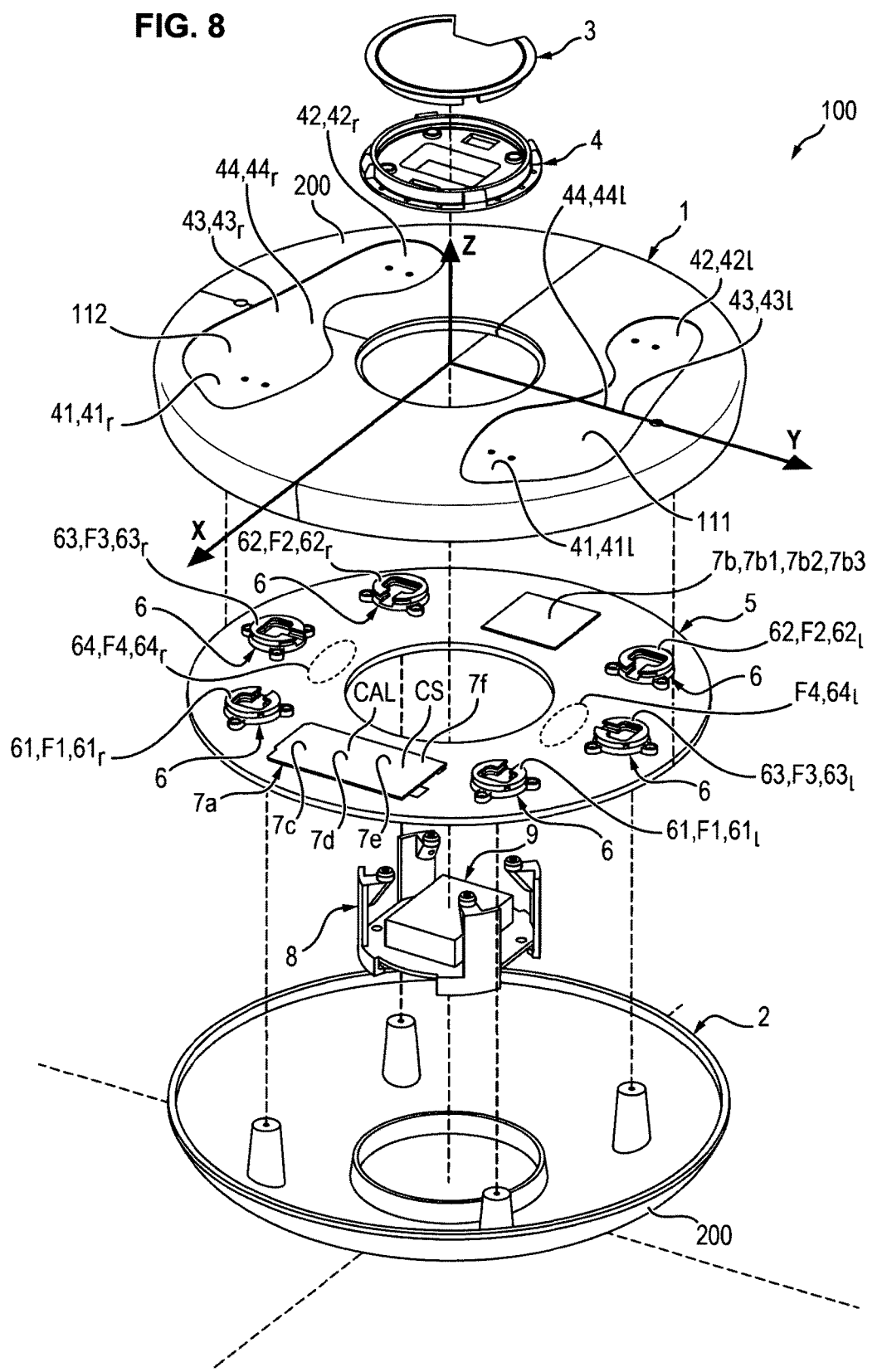
Figure 9:
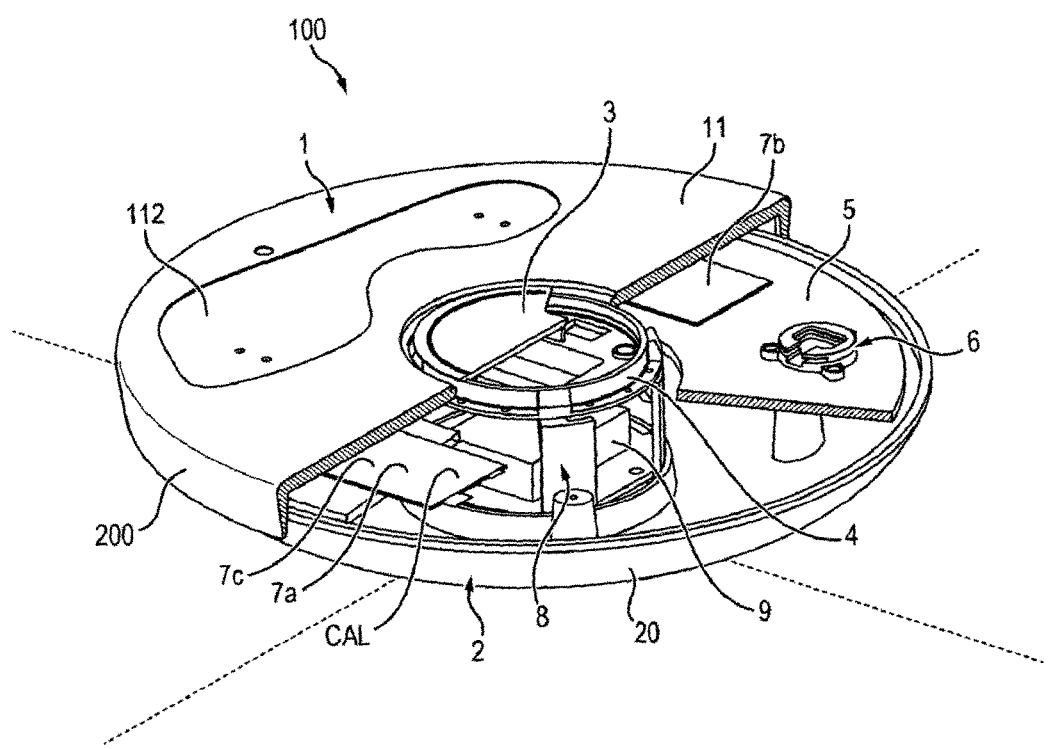
Figure 14A:
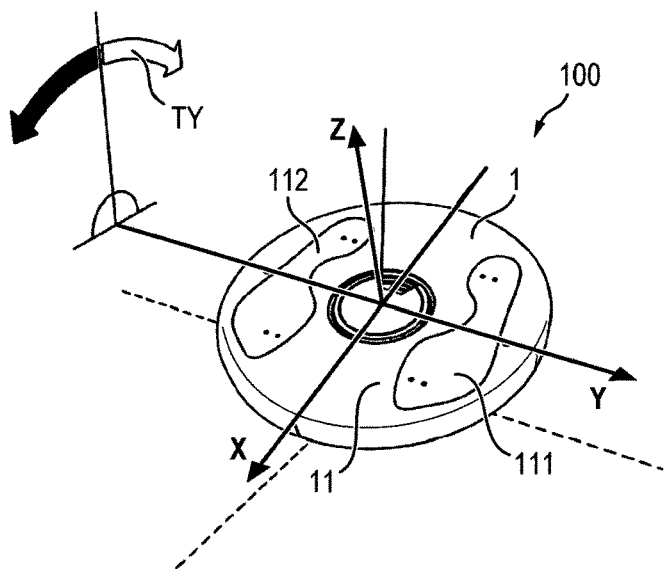
Figure 14B:
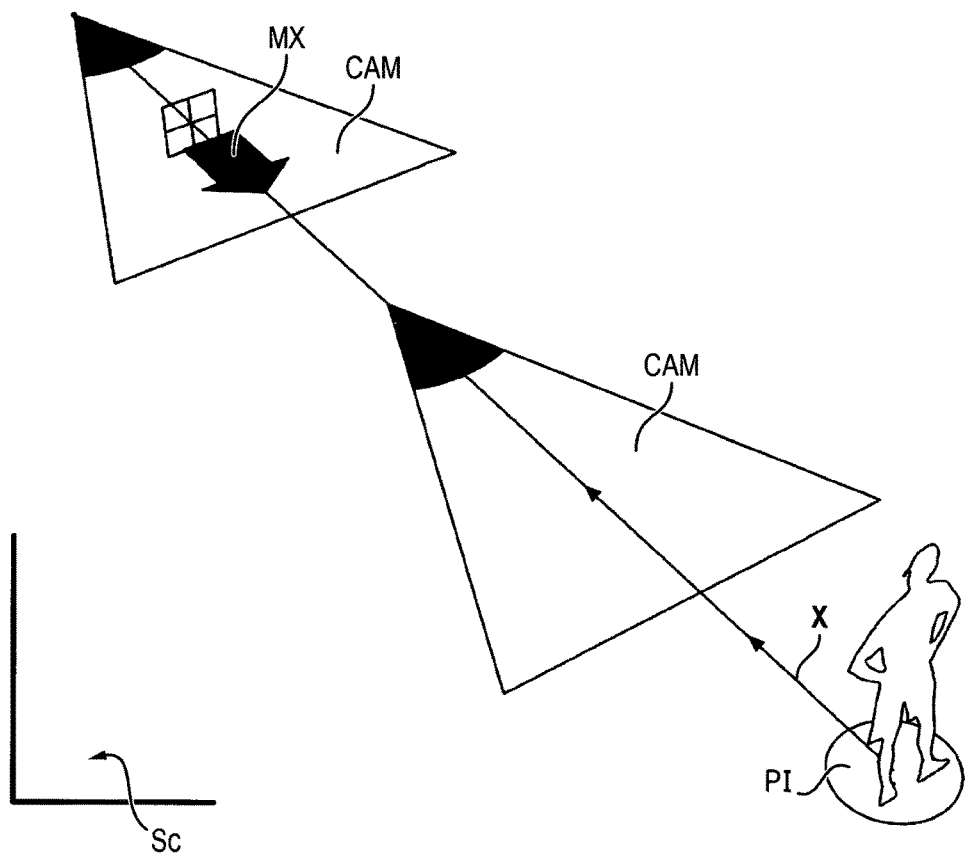
Figure 15A:
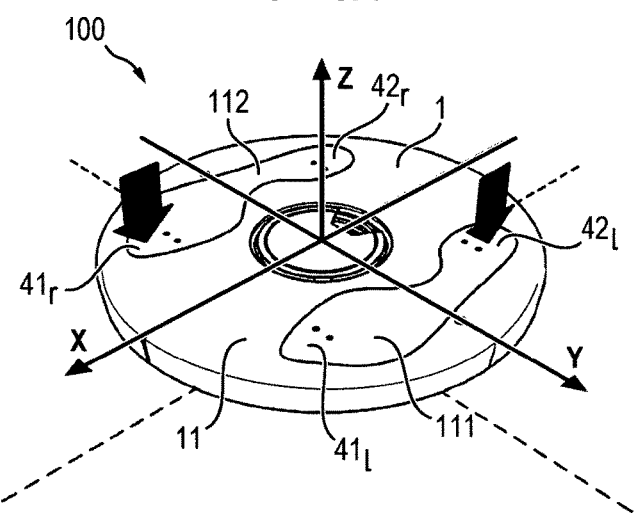
Figure 15B:
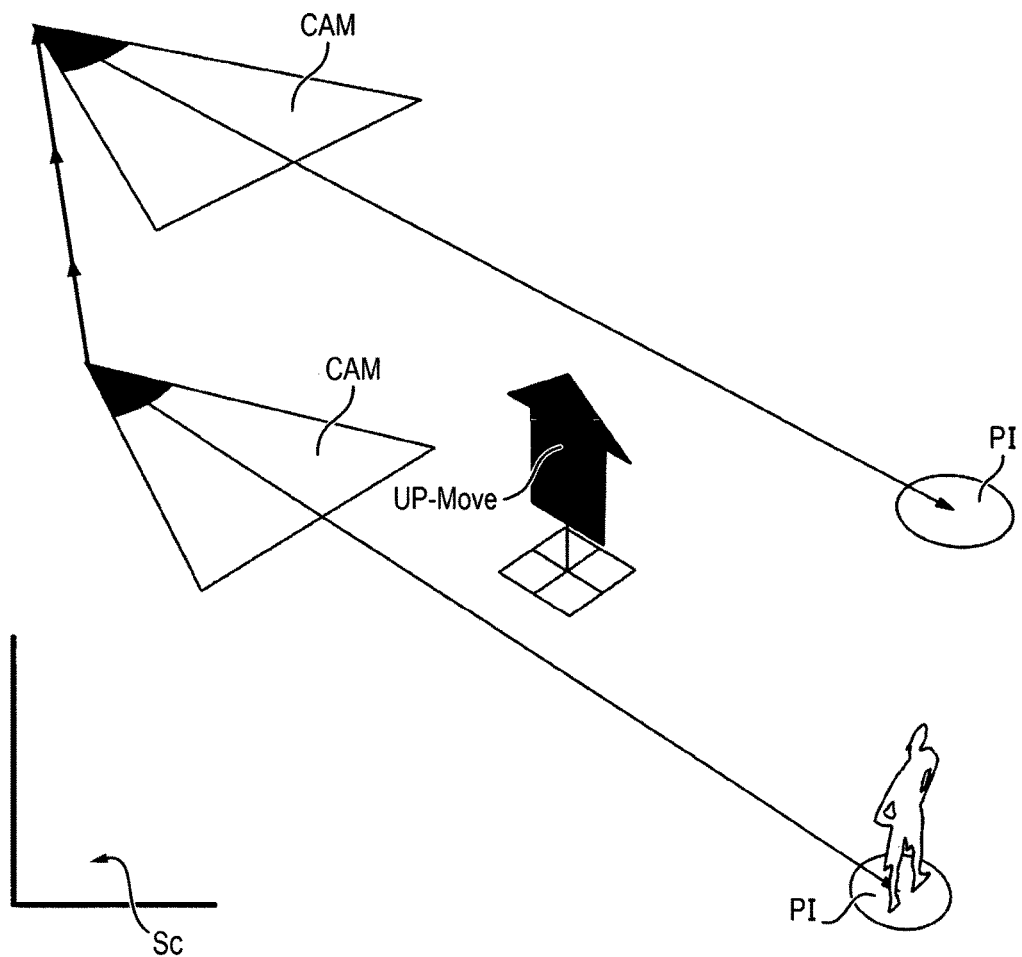
Figure 16A:
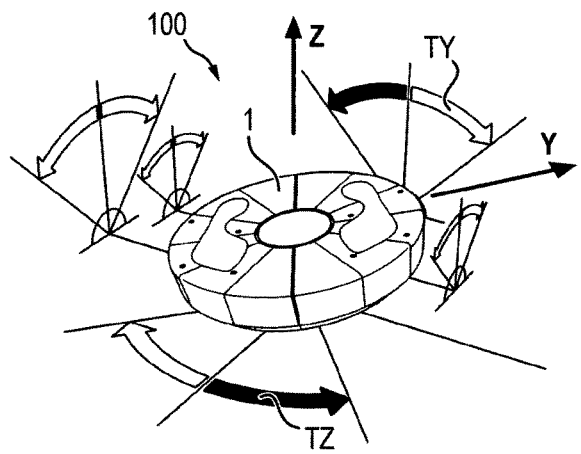
Figure 16B:
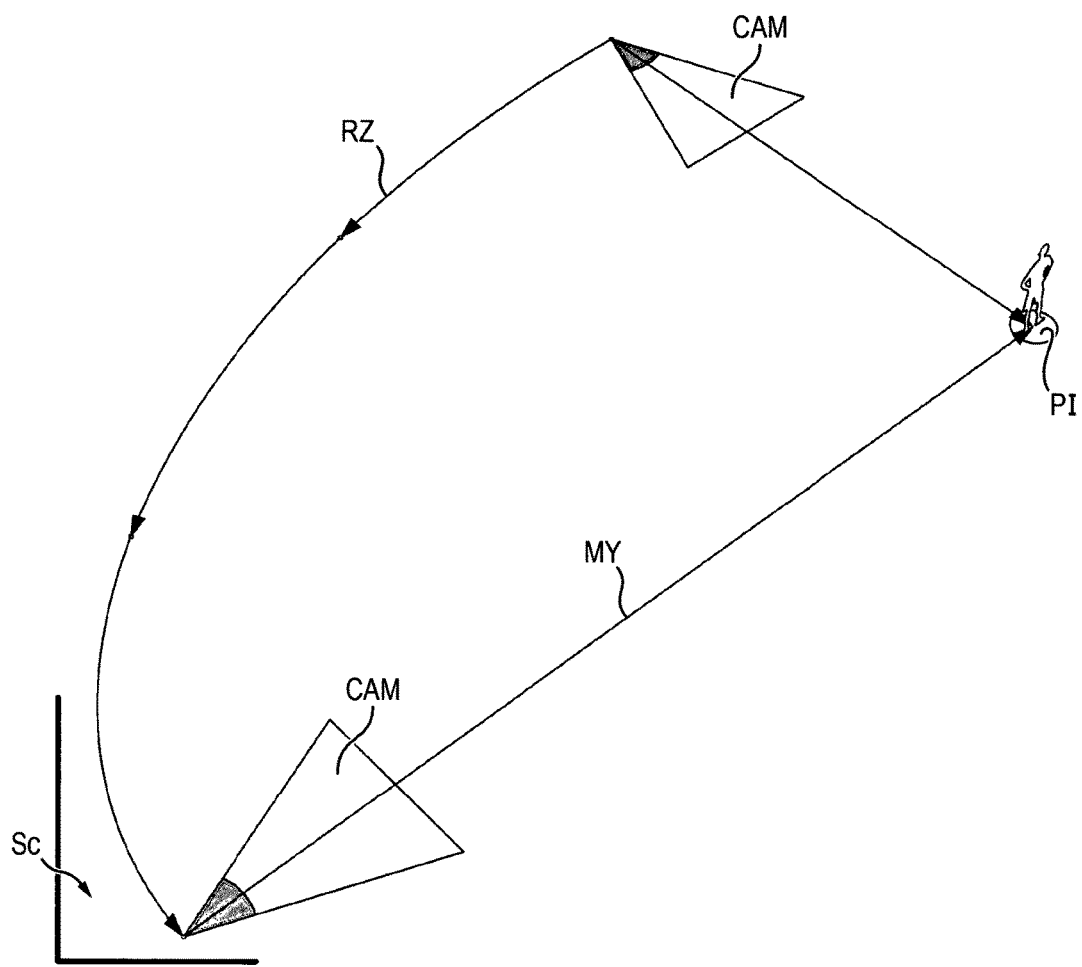
Figure 16C:
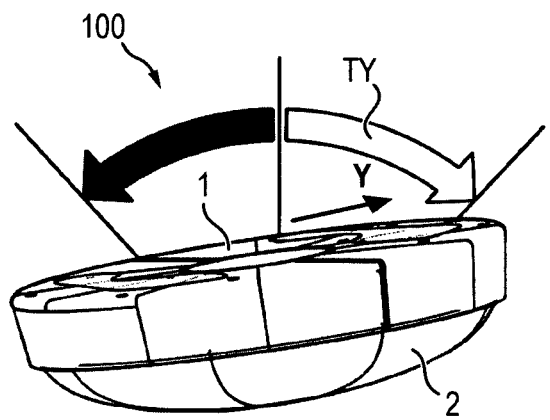
Figure 16D:
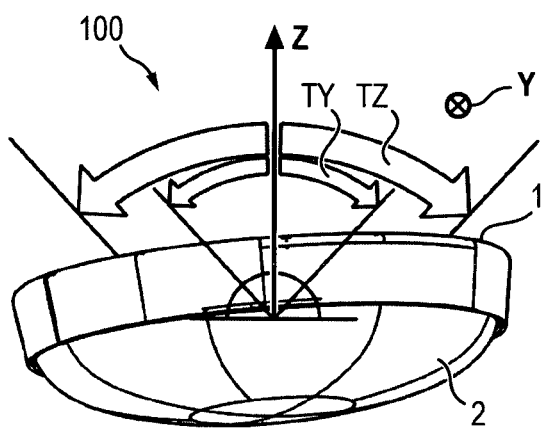
Figure 17A:
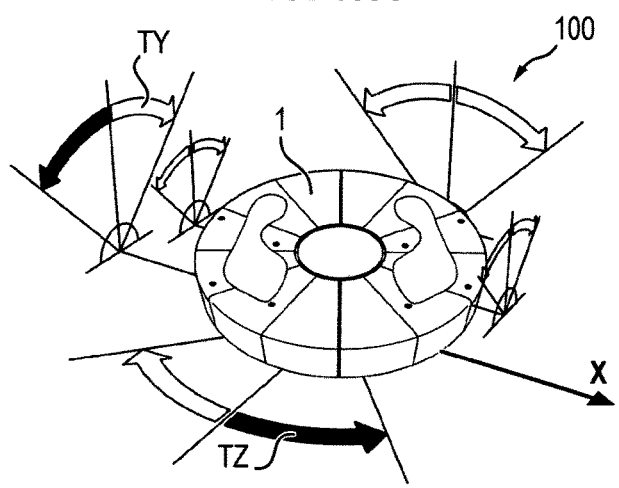
Figure 17B:
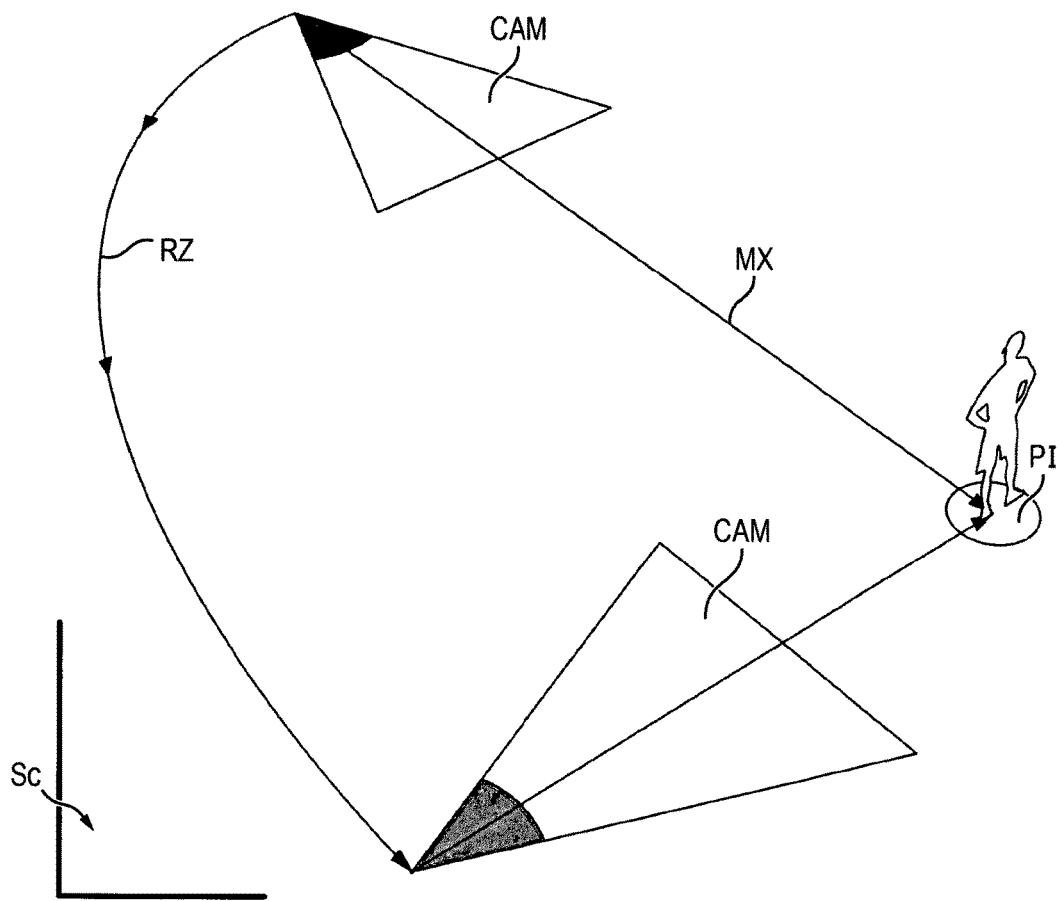
Figure 17C:
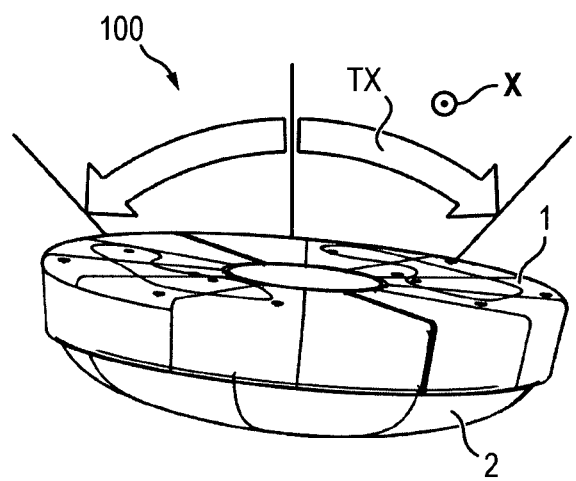
Figure 17D:
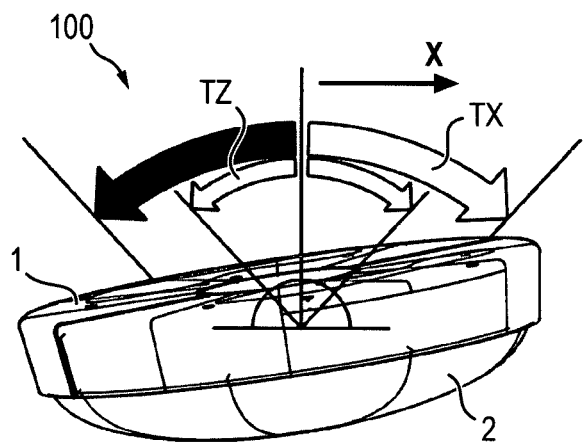
Figure 18A:
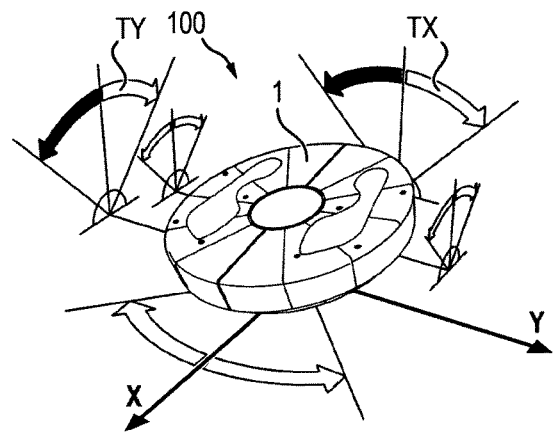
Figure 18B:
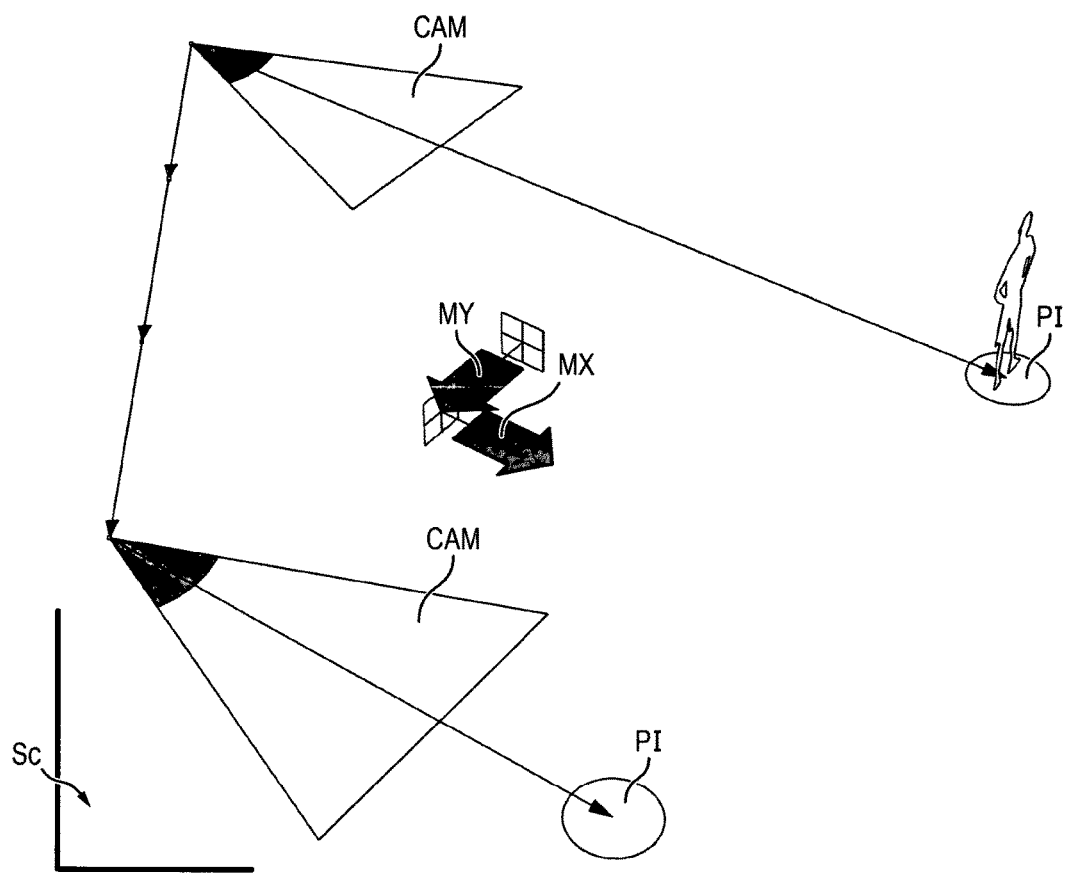
Figure 18C:
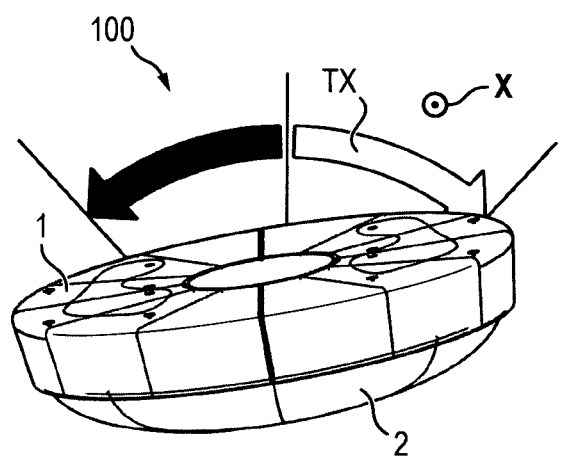
Figure 18D:
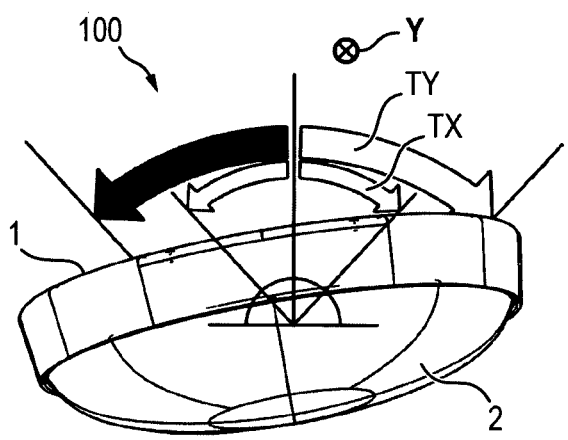
Figure 19:
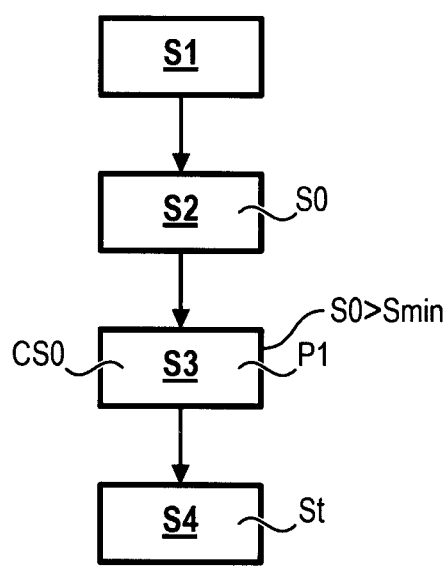

The invention will be better understood on reading the following description, given solely as non-limitative examples in reference to the appended drawings, in which FIGS. 1, 2, 3 and 4 are respectively schematic perspective, top, right and front views of a foot-operated controller according to an embodiment of the invention, FIG. 5 is a schematic view seen from the right of the foot-operated controller in a balanced position when the feet are not put on the foot-operated controller, according to an embodiment of the invention, FIG. 6 is a schematic view seen from the right of the foot-operated controller in the rest position of the feet on it, corresponding to a reference, FIG. 7 is a schematic view seen from the right of the foot-operated controller in a second position for operating the control signal in a position different from the reference of FIG. 6, FIG. 8 is a schematic exploded perspective view of the foot-operated controller according to an embodiment of the invention, FIG. 9 is a schematic perspective internal view of the foot-operated controller according to an embodiment of the invention, FIGS. 10 and 11 are respectively schematic side view and perspective view of the foot-operated controller according to another embodiment of the invention, FIGS. 12B, 13B, 14B, 15B, 16B, 17B, 18B, are schematic views of movements of a camera, shown by a cone, operated on a screen or in virtual environments by the foot-operated controller according to embodiments of the invention according to respectively the movements carried out by the feet on FIGS. 12A, 13A, 14A, 15A and, respectively, 16A, 16C, 16D for FIG. 16B, on FIGS. 17A, 17C, 17D for FIG. 17B, on FIGS. 18A, 18C, 18D for FIG. 18B, FIG. 19 is an organigram of a method for operating the controller according to an embodiment of the invention.

On FIGS. 1-11, a foot-operated controller 100 comprises a top platform 1 attached to a bottom cup 2. The top platform 1 is rigidly attached to the bottom cup 2, so that the top platform 1 carries out the same movement at the bottom cup 2. The top platform 1 and the bottom cup 2 define together a casing 200, which is closed and contains other means of the controller 100, such as the means 6, 7a, 7b, 7c described below.

The bottom cup 2 has a lower surface 20 of curved shape for rotating on its lower surface 20, for example on the ground as can been seen from FIGS. 1, 2, 3 and 4 or on a lower base 30 as can be seen from FIGS. 10 and 11. The lower surface 20 may be covered on its external face by a non-slip material or may have an outer antiskid surface, for preventing the bottom cup 2 to slide on the ground. In another embodiment not shown, the top platform 1 may be rotatable relative to the bottom cup 2 around the first yaw axis Z.

The top platform 1 has at least a top surface 11 for receiving the feet of the user.

The convexity of the lower surface 20 is turned to the top, i.e. to the top platform 1, so that the lower surface 20 can rotate or tilt on the ground or on the lower base 30.

The top surface 11 may have a certain softness or flexibility, for example in the optional footprint 111 and/or 112 described below or for example for all the top surface 11, which may or may not have the footprint 111 and/or 112. The top platform may be semi-rigid. The softness or flexibility of the top surface 11 is provided to transmit forces applied by the feet on the top surface 11 to the strength sensor(s) 6. When several strength sensors 6 are provided, the softness or flexibility of the top surface 11 is provided to transmit forces individually to the strength sensors 6. The foot-operated controller comprises rotation sensors 7b for measuring rotations of the top platform 1 and/or of the bottom cup 2 about a first yaw axis Z, a second roll axis X and a third pitch axis Y. The first yaw axis Z, the second roll axis X and the third pitch axis Y are tri-dimensional, i.e. not coplanar. The first yaw axis Z, the second roll axis X and the third pitch axis Y are for example secant with each other. For example, the first yaw axis Z, the second roll axis X and the third pitch axis Y are perpendicular to each other. The three axes X, Y and Z are linked to the top platform 1. For example, the top surface 11 of the top platform 1 is planar or substantially planar.

For example, the second roll axis X is an axis situated in a plane of the surface 11 or tangential to the surface 11 and being horizontal and extending from the rear to the front in a position of the controller 100, which can be the empty position and/or balanced position of FIGS. 1, 2, 3, 4 and 5, 10 and 11.

For example, the third pitch axis Y is an axis situated in a plane of the surface 11 or tangential to the surface 11 and being horizontal and extending from the right to the left in a position of the controller 100, which can be the empty position and/or balanced position of FIGS. 1, 2, 3, 4 and 5, 10 and 11.

For example, the first yaw axis Z is normal to the second roll axis X and the third pitch Y and extends from the bottom to the top and may be vertical in the empty position and/or balanced position of the controller 100 of FIGS. 1, 2, 3, 4 and 5, 10 and 11.

The rotation sensors 7b comprises at least a first yaw rotation sensor 7b1 for measuring rotation of the top platform 1 and/or of the bottom cup 2 about the first yaw axis Z, at least a second roll rotation sensor 7b2 for measuring rotation of the top platform 1 and/or of the bottom cup 2 about the second roll axis X and at least a third pitch rotation sensor 7b3 for measuring rotation of the top platform 1 and/or of the bottom cup 2 about the third pitch axis Y.

The lower cup 2 and/or the top platform 1 is able to carry out yaw movements and/or roll movements and/or pitch movements on ground or on the lower base 30, i.e. rotation or tilting about respectively axis Z, axis X and axis Y. The yaw movements and/or roll movements and/or pitch movements of the lower cup 2 and/or the top platform 1 are measured by the rotation sensors 7b. The roll movements may be calculated from one strength sensor, which may include one or several accelerometers to measure acceleration, for example in three dimensions, and which may include gyrometer(s), in order to obtain a more accurate measurement. The pitch movements may be calculated from one strength sensor, which may include one or several accelerometers to measure acceleration, for example in three dimensions, and which may include gyrometer(s), in order to obtain a more accurate measurement.

In an embodiment, the rotation sensors 7b may measure rotation angle and/or rotation speed and/or rotation acceleration around the axis X, Y and Z. In an embodiment, the rotation sensors 7b are embodied by an attitude and heading reference system or AHRS composed of 3 gyrometers to measure rotation speed around axis X, Y and Z, 3 accelerometers to measure the accelerations according to axis X, Y and Z, enabling acquisition of X, Y and Z values of gravity vector in the controller 100, and thus the computation of pitch and roll of the controller 100, 3 magnetometers to measure the magnetic field according to axis X, Y and Z, in order to compute the heading.

Heading, pitch and roll may be measured with increased precision and reduced latency by using an Extended Kalman Filter which provide data fusion of the 9 values described above.

Thanks to the lower surface 20 of curved convex shape, the bottom cup 2 and the top platform 1 are able to tilt and/or rotate about each of the first yaw axis Z (yaw movement), the second roll axis X (roll movement) and the third pitch axis Y (pitch movement), or about two or three of them in combination.

The controller 100 comprises also one or several strength sensor(s) 6 (or strength gauge sensor(s) 6) serving to measure a strength applied on the top platform 1.

The controller 100 comprises also means 7a or a generator 7a for generating control signals CS from the rotations measured by the rotation sensors 7b and from the strengths measured by the strength sensor(s) 6. The generator 7a or the means 7a of generation is connected to the strength sensor(s) 6 and to the rotation sensors 7b. The rotation sensors 7b, the strength sensor(s) 6 and/or the means 7a for generating control signals CS are housed between the top platform 1 and the bottom cup 2, i.e. in the casing 200. The control signals CS may be used as commands for the machine.

Examples of commands are given in FIGS. 12-18.

As examples, in an embodiment, the controller 100 enables to move a camera CAM symbolized by the cone or triangle shown on FIGS. 12B, 13B, 14B, 15B, 16B, 17B, 18B. Of course, other commands are possible.

The curved convex shape of the lower surface 20 is continuous and tridimensional. The tilting or rotation of the bottom cup 2 on the ground or on the lower base 30 is then continuous, enabling to generate control signals CS which are continuous along time i.e. progressive when tilting or rotating the platform 1. Progressive commands may be generated from the control signals CS, enabling, based on amplitude and direction, to obtain low or high speed of movement, high precision, command inversion, interface with machines for virtual or discreet movement control, without usage restriction.

In an embodiment, the pressure and the movements of the feet placed on the controller are translated into progressive values of the control signals CS, used to control the connected machine.

The curved convex shape of the lower surface 20 is for example of revolution or symmetric around a vertical axis or first yaw axis Z normal to the top platform 1. Then, the top platform 1 tilts in the same way in all directions.

The controller 100 comprises means 7c to register or to store an initial rotation position P1 of the top platform 1 and/or of the bottom cup 2 measured by the rotation sensor(s) 7b relative to the first yaw axis Z and/or relative to the second roll axis X and/or relative to the third pitch axis Y and/or an initial force measured by the strength sensor(s) 6, when it is detected that the strength sensor(s) 6 measures a strength representative of the presence of the feet on the top platform 1, i.e. when the user puts his feet on the surface 11, as shown on FIG. 6. The initial rotation position P1 and/or the initial force and/or the not null angle A1 is stored in a memory 7c1, which may be a permanent or non-volatile memory, or a volatile memory, for example of the calculator CAL. The strength representative of the presence of the feet on the top platform (1) is not null. This initial rotation position P1 of the top platform 1 and/or the initial force corresponds to the fact that the top platform 1 is inclined by at least a not null angle A1 to the rear about the third pitch axis Y relative to an horizontal position P0 of the top platform 1 or relative to a prescribed horizontal plane HP in general. The not null angle A1 to the rear, having been measured by the rotation sensors 7b is registered by the means 7c, for example in said memory 7c1. This initial rotation position P1 of the top platform corresponds to a rest position of the feet on the top platform 1 according to FIG. 6, when the user is sitting and/or the initial force corresponds to a rest force of the feet on the top platform 1 according to FIG. 6, when the user is sitting. This horizontal position P0 of the top platform 1 is for example the empty position shown on FIG. 5, in which no foot is on the top platform 1, in which the foot-operated controller 100 is in a balanced position on the ground or on the lower base 30 and in which the axes X and Y are for example horizontal (and define the horizontal plane HP) and the axis Z is vertical, as shown on FIG. 5. The initial rotation position P1 of the top platform 1 and/or of the bottom cup 2 measured by the rotation sensor(s) 7b and/or the initial force is a calibration position, which initiates calibration of the control signals on this initial rotation position P1.

The foot-operated controller 100 is then a foot-operated controller 100 to be used sitting or a foot-operated controller 100 while sitting.

The control signals CS are generated by the means 7a or the generator 7a to take as a reference CS0 the initial rotation position P1 measured by the rotation sensors 7b and/or the initial force measured by the strength sensor(s) 6.

For example, a method of operating the foot-operated controller 100 or the device 101 is as follows, as shown on FIG. 19.

In a first step S1, a user puts his two feet on the top platform 1 of the foot-operated controller 100, i.e. on the surface 11. The controller 100 is then in the position of FIG. 6.

Then, in a second step S2, the at least one strength sensor 6 measures a strength S0 exerted on the top platform 1 by the two feet.

Then, in a third initialisation step S3, the initial rotation position P1 of the top platform 1 and/or of the bottom cup 2 relative to at least one of the first yaw axis Z, second roll axis X and third pitch axis Y is measured by the rotation sensors 7b and/or an initial force is measured by the strength sensor(s) 6, in response to the fact that the strength S0 measured in the second step S2 by the at least one strength sensor 6 is representative of the presence of the feet on the top platform 1. For example, the third initialisation step is carried out when the strength S0 measured by the at least one strength sensor 6 in the second step S2 is higher than a lower prescribed strength threshold Smin, for example being not null. Then, the third initialisation step S3 provides calibration of the control signals CS on the initial rotation position P1 and/or on the initial force. For example, in case of several strength sensors 6 for each foot, the forces measured by the strength sensors 6 for the right foot (for example 61$_r$ and/or 62$_r$ and/or 63$_r$, and/or 64$_r$ as described below) are summed and the forces measured by the strength sensors 6 for the left foot (for example 61$_l$ and/or 62$_l$ and/or 63$_l$, and/or 64$_l$ as described below) are summed, and each sum has to be higher than the lower prescribed strength threshold Smin, in order to trigger the third initialisation step.

FIG. 6 shows the foot-operated controller 100 in the first step S1, the second step S2 and the third initialisation step S3.

Then, in a fourth step S4 after the third initialization step S3, the user may move his feet to tilt the bottom cup 2 relative to the initial rotation position P1, as shown for example on FIG. 7. In the fourth step S4, the at least one strength sensor 6 measures a strength St exerted on the top platform 1 or the strength sensor(s) 6 measure a distribution of forces on the top platform 1, and the rotation sensors 7b measure rotations of the top platform 1 and/or of the bottom cup 2 about the first yaw axis Z and/or the second roll axis X and/or the third pitch axis Y. The control signals CS are then generated by the means 7a or the generator 7a depending of the strength St and rotations measured during the fourth step S4 to have as a reference CS0 the initial rotation position P1 and/or the initial force. The means 7a or the generator 7a are calibrated on the initial rotation position P1 and/or the initial force and take as reference or zero position for the control signals the initial rotation position P1 and/or the initial force.

The steps S1, S2 and S3 may be carried out automatically when switching on the controller 100. The steps S1, S2 and S3 may be initiated when the user puts his or her feet on the top platform 1 for at least a minimum time without substantially moving the top platform 1 more than a preset range about axis X, Y and Z (for example a small and involuntary movement).

The initial rotation position P1 may also be inclined by a not null angle about the second roll axis X relative to the horizontal plane HP and/or may also be inclined by a not null angle about the first yaw axis Z, i.e. relative to a vertical axis.

For example, the foot-operated controller 100 may enable to control a machine as, for example, computers, game consoles, industrial machines, drones, video cameras, a screen, or any other electronic device or others. The controller 100 may be used to control the moving of a pointer or of a point of view or of an object on a screen Sc which is seen by the user, for example of a computer. The controller 100 may be used to control navigation on the screen, for example a bi-dimensional or tri-dimensional navigation. The controller 100 may be used to move a user in a controlled manner in a virtual world, for example using a head-mounted display (or audio and/or video helmet).

The controller 100 may be used not to move on a screen.

The controller 100 may be used for remote control of a machine in the real world. The controller 100 may be used to drive and/or move in a controlled and remote manner a physical and/or real object, which may be for example a drone, for example a submarine drone, or a surgical instrument, or a video camera or photo camera, or others. The controller 100 may be used to drive and/or move in a controlled and remote manner a physical vehicle or any physical machine.

For example, in an embodiment, in the initial rotation position P1, i.e. in the rest position and/or at the rest force of the feet on the top platform 1 inclined by at least the angle A1 to the rear about the third pitch axis Y relative to the horizontal plane HP, the control signals CS are preset to put the pointer Pt at the center C of the screen Sc at the end of the third initialisation step S3.

For example, in an embodiment, the amplitude of the control signals CS may be taken relative to the value of the control signals CS in the initial rotation position P1 and/or at the initial force and/or at the rest force and/or at the reference CS0 and/or at the not null angle A1.

The control signals CS or the amplitude of the control signals CS relative to the value of the control signals CS in the initial rotation position P1 and/or at the initial force and/or at the rest force and/or at the reference CS0 and/or at the not null angle A1 may be used to control the moving of the physical or virtual object from the immobile position or the speed of the physical or virtual object from the immobile position. The control signals CS or said amplitude of the control signals CS may be a speed command of the physical or virtual object.

In an embodiment, the initial rotation position P1 and/or the initial force and/or the rest position and/or the rest force and/or the reference CS0 and/or the not null angle A1 corresponds to an immobile position of a physical or virtual object, which may be the sole immobile position of it.

For example, the moving or speed may be an increasing function of said amplitude of the control signals CS. Then, in an embodiment, the more the tilting, the faster it moves. The initial rotation position P1 and/or the initial force and/or the rest force and/or the reference CS0 and/or the not null angle A1 corresponds for example to speed equal to zero.

In an embodiment, all the rotation positions different from the initial rotation position P1, and/or all the strength measured different from the initial force and/or all the position of the feet on the controller 100 different from the rest position and/or all the reference signals different from the reference CS0 and/or all the angles about the third pitch axis Y different from the not null angle A1, may correspond to a mobile position of the virtual or physical object, or to not null speed of the virtual or physical object.

In the initial rotation position P1 corresponding to the rest position and/or to the rest force of the feet on the platform 1, the feet are slightly inclined to the rear, which is a balanced position of the feet on the platform 1 when the user is sitting on a seat. In this position P1, the user makes no effort on his feet, which is the most comfortable position.

Then, in the fourth step S4, the user moves his feet, for example to the front as shown on FIG. 7. This moves in the fourth step S4 the pointer Pt in another position on the screen Sc, for example forwards, which can be represented by the pointer Pt being above the center C.

In an embodiment, the means 7c are provided to register the reference CS0, i.e. the value CS0 (or zero position CS0) of the control signals CS at the initial rotation position P1 having being registered and/or at the initial force having being registered.

Then or when the feet of the user tilt the controller 100 about the three axes X, Y, Z, the amplitude of the control signals CS will be taken relative to the initial rotation position P1 and/or to the initial force, i.e. to the rest position and/or at the rest force of the feet on the platform 1, i.e. relative to the most comfortable position of the feet, then reducing stress and long use tiredness of the user.

Especially, a user will not have to exert a muscular and articular effort on his feet to put the control signals CS on the zero position CS0, i.e. at the center C of the screen Sc.

The angle A1 may be for example strictly greater than 0° and lower than or equal to 20°. The angle A1 may be for example strictly greater than 0° and lower than or equal to the maximum tilting amplitude of the lower surface 11 of the bottom cup about the third pitch axis Y. The angle A1 may be for example in the range going from 0.01° to 20°, or 0.1° to 20°, or 1° to 18°, or 1° to 15°, or 1° to 10°, or 1.4° to 5.4°, or 3° to 4° of the top platform 1 to the rear under the horizontal position or horizontal plane HP about the third pitch axis Y. A typical value of the angle A1 may be for example 3.4°.

The maximum tilting amplitude of the lower surface 11 of the bottom cup about the third pitch axis Y and/or about the second roll axis X is not null and may be for example lower than 30°, or lower than 20°, or lower than 18°, or lower than 15° relative to an horizontal plane, which is for example HP. A typical value of this maximum tilting amplitude is for example 17.9°.

The top surface 11 of the top platform 1 may have a left engraved footprint 111 and/or a right engraved footprint 112. The left engraved footprint 111 serves to receive the left foot of the user. The right engraved footprint 112 serves to receive the right foot of the user. The left engraved footprint 111 and/or the right engraved footprint 112 may have the size of the feet of an adult. The left engraved footprint 111 and/or the right engraved footprint 112 are optional.

In an embodiment, the strength sensor(s) 6 is/are located under the left engraved footprint 111 and/or under the right engraved footprint 112.

Of course, in the embodiments and examples below, the footprint 111 and/or 112 may not be present. In the embodiments and examples below, the left engraved footprint 111 and the right engraved footprint 112 may be replaced more generally by the top surface 11 or the top platform 1 with no left engraved footprint 111 and/or no right engraved footprint 112.

In embodiments, there are provided at least two strength sensors 6, situated under points of the top platform 1 which are distant from each other.

In the embodiment shown on FIG. 8, the at least one strength sensor 6 comprises a first strength sensor 61 and a second strength sensor 62 placed under respectively a first point 41 of the top platform 1 and a second point 42 of the top platform 1, which is distant from the first point 41 along the second roll axis X.

In the embodiment shown on FIG. 8, the at least one strength sensor 6 comprises at least a further strength sensor 6, which may be strength sensor 63 and/or 64, placed under a further point, which may be point 43 and/or 44 of the top platform 1, which is distant from the first point 41 and from the second point 42. For example, the further point is not aligned with the first and second points. The further strength sensor 6 may be situated under the further point situated on an external side relative to the rectilinear line joining the first point and the second point, like for example for strength sensor 63. The further strength sensor 6 may be situated under the further point situated on an internal side relative to the rectilinear line joining the first point and the second point, like for example for strength sensor 64.

In an embodiment shown on FIG. 8, the at least one strength sensor 6 comprises a third strength sensor 63 and a fourth strength sensor 64 placed under respectively a third point 43 of the top platform 1 and a fourth point 44 of the top platform 1, which is distant from the third point 43 along the third pitch axis Y. The strength sensor 61 and/or 62 and/or 63 and/or 64 may be provided under the left engraved footprint 111 or under the right engraved footprint 112 or under each of them. For example, the third strength sensor 61 is under the tow part 41 of the left engraved footprint 111 and/or of the right engraved footprint 112, on which the tow of the left and/or right foot is put by the user. For example, the second strength sensor 62 is under the heel part 42 of the left engraved footprint 111 and/or of the right engraved footprint 112, on which the heel of the left foot and/or right foot is put by the user. For example, the third strength sensor 63 is under a middle external part 63 of the left engraved footprint 111 and/or of the right engraved footprint 112. For example, the fourth strength sensor 64 is under a middle internal part 64 of the left engraved footprint 111 and/or of the right engraved footprint 112.

In an embodiment, there can be sensors 61, 62, 63 and 64 under the surface 11 for the right foot (named $61_r$, $62_r$, $63_r$, $64_r$) and sensors 61, 62, 63 and 64 under the surface 11 for the left foot (named $61_l$, $62_l$, $63_l$, $64_l$). In another embodiment, there can be sensors 61, 62 and 63 under the surface 11 for the right foot (named $61_r$, $62_r$, $63_r$) and sensors 61, 62 and 63 under the surface 11 for the left foot (named $61_l$, $62_l$, $63_l$, $64_l$).

In an embodiment, the calculator CAL calculates a first difference of pressure between the pressure F1 measured by the first strength sensor 61 and the pressure F2 measured by the second strength sensor 62, wherein the control signals are generated by the generator 7*a* depending on at least the first difference of pressure F1−F2 or depending on a normalized first difference of pressure (F1−F2)/(F1+F2). The sensors 61 and 62 then enable the user to operate the controller by exerting forward or backward pressure on his foot or feet, or from one foot to the other.

For example, the calculator CAL calculates a twist value TW being the sum of the normalized first difference of pressure (F1−F2)/(F1+F2)$_r$ under the right engraved footprint 112 or under the surface 11 for the right foot, and of the normalized first difference of pressure (F1−F2)/(F1+F2)$_l$ under the left engraved footprint 111 or under the surface 11 for the left foot, i.e.:

$TW=(F1-F2)/(F1+F2)_r+(F1-F2)/(F1+F2)_l$

In an embodiment, the control signals CS are generated by the generator 7*a* depending on at least the twist value TW.

In an embodiment, the twist value TW or first difference or first normalized difference or pressures F1 and F2 is used to generate control signals CS causing a movement along a vertical axis, for example on FIGS. 15A and 15B an upwards movement UP-Move in a screen Sc when exerting a pressure by the tow of the right foot on the right point $41_r$ (and then on the strength sensor 61 under the right footprint 112) and exerting a pressure by the heel of the left foot on the left point $42_l$ (and then on the strength sensor 62 under the left footprint 111), which is called hereinafter exerting a twist pressure on the strength sensors 6. The twist value TW may used to generate control signals CS causing a downwards movement in a screen Sc when exerting a pressure by the tow of the left foot on the left point $41_l$ (and then on the strength sensor 61 under the left footprint 111) and exerting a pressure by the heel of the right foot on the right point $42_r$ (and then on the strength sensor 62 under the right footprint 112), which is called also hereinafter exerting a twist pressure on the strength sensors 6. Of course, this can be the contrary for controlling the upwards movement and the downwards movement by the strength sensors. The user moves along the axis Z (or rotate vertically around the point of interest) on screen or in virtual environments by pressing with the forward part of one foot and the back part of the opposite foot, or by making the opposite movement ("tork" movement). FIGS. 15A and 15B show for example pan view up or down.

The sensors 61 and 62 enable to operate the controller 100 by flexing or extending the foot or feet, without tilting the platform 1 about the axis X, Y and Z, or by simultaneously tilting the platform 1 about the axis X and/or Y and/or Z.

In an embodiment, the calculator CAL calculates a second difference of pressure between the pressure F3 measured by the third strength sensor 63 and the pressure F4 measured by the fourth strength sensor 64, wherein the control signals are generated by the generator 7*a* depending on at least the second difference of pressure F3−F4 or depending on a normalized second difference of pressure (F3−F4)/(F3+F4). The sensors 63 and 64 then enable the user to operate the controller by exerting pressure turned to the inside or the outside on his foot or feet, or from one foot to the other.

For example, the calculator CAL calculates a lock value LO being the sum of the normalized second difference of pressure (F3−F4)/(F3+F4)$_r$ under the right engraved footprint 112 or under the surface 11 for the right foot, and of the normalized first difference of pressure (F3−F4)/(F3+F4)$_l$ under the left engraved footprint 111 or under the surface 11 for the left foot, i.e.:

$LO=(F3-F4)/(F3+F4)_r+(F3-F4)/(F3+F4)_l$

In an embodiment, the second difference of pressure F3−F4 or normalized second difference of pressure (F3−F4)/(F3+F4) or lock value LO or pressures F3 and F4 is used to generate control signals CS causing a lock action in order for example to catch a virtual object or target on a screen, when exerting a pressure turned to the inside of the foot or feet on the right point $44_r$ and/or left point $44_l$ (and then on the strength sensor 64 under the right footprint 112 and/or on the strength sensor 64 under the left footprint 111), and conversely causing a free action or unlock action in order to free the virtual object or target on the screen, when exerting a pressure turned to the outside of the foot or feet on the right point $43_r$ and/or left point $43_l$ (and then on the strength sensor 63 under the right footprint 112 and/or on the strength sensor 63 under the left footprint 111).

Of course, in the above, in other embodiments, the sensor 63 or 64 may be absent, and/or the sensor 61 or 62 may be absent.

Figure 2:
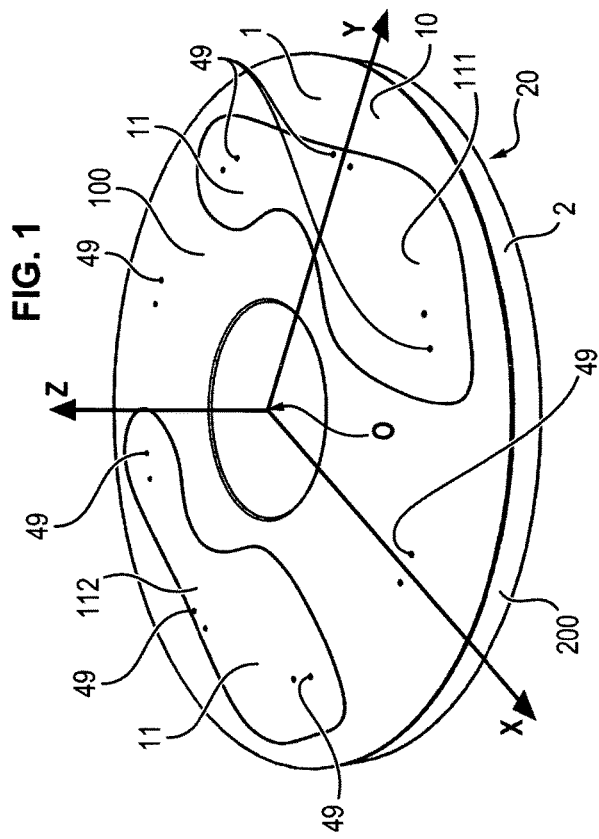
Figure 4:
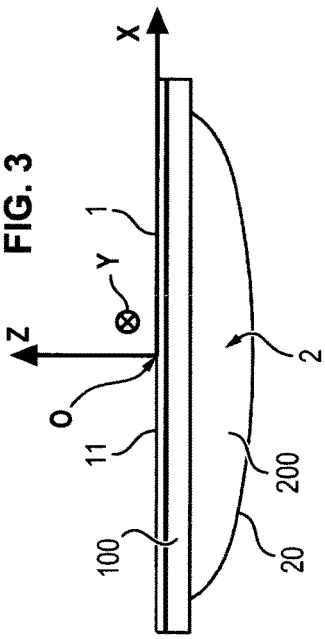

In another embodiment, shown on FIGS. 1 and 2, the at least one strength sensor 6 comprises a plurality of strength sensors 69 distributed around the vertical axis Z under the top platform 1, i.e. under respectively a plurality of points 49 of the top platform 1. The distance between the points 49 may be smaller than the size of an adult foot, for example smaller than 30 cm. In this case, the controller 100 is adapted to any position of the two feet of the user on the top platform 1, even if the user does not put his feet in the footprints 111 and/or 112 when they are present. This embodiment is called omnidirectional. The distance between the points on which the sensors 6 are distributed is provided so that in any position of the two feet on the top platform 1, each foot will be above at least one of the points 49 and consequently above one of the strength sensors 69, in order to exert a strength on it or them. This enables to detect the presence of the feet on the top platform 1 in any position of them, especially when the user does not pay attention when he places his feet on the controller 100, or if he or she does not see his or her feet when sitting at a non-transparent desk or table. The sensors 69 may be distributed regularly around the Z axis. For example, there is at least one strength sensor 69 provided at every 45° around axis Z. In another example, there is at least one strength sensor 69 provided at every 120° around axis Z. In another example, an array of strength sensors 6, which may form a tactile array, is provided under all the top surface 11.

In an embodiment, for example in the omnidirectional embodiment mentioned above or in all of the embodiments having at least a strength sensor 6 (with or without the right engraved footprint 112 and/or left engraved footprint 111) the controller 100 has means 7*f* to determine the second roll axis X and/or the third pitch axis Y from the initial rotation position P1 having been registered and corresponding to the not null angle A1 to the rear, having been measured by the rotation sensors 7*b* or from a specific predefined movement around one of this 2 axes, for example tilting to the front then to the rear just before moving to the initial position corresponding to the rest position. For example, the direction of the second roll axis X from the rear to the front may be calculated from the inclination of the not null angle A1 having been measured by the rotation sensors in the initial rotation position having been registered. The initial rotation position P1 having been registered may serve to detect the position of the back of the feet of the user on the platform 1. Then, the calibration and/or initial rotation position P1 gives a preset for orientation of the controller 100, and/or a preset for the orientation of the axes X, Y and Z and/or a preset for speed. The means 7*f* are for example part of the calculator CAL. In the above each means may be replaced by the calculator CAL.

In the embodiment of FIGS. 10 and 11, there is a lower base 30 separated from the bottom cup 2. The lower base 30 supports the bottom cup 2 and allows rotations of the bottom cup 2 about the first yaw axis Z, the second roll axis X and the third pitch axis Y, then there is formed a device 101 comprising the foot-operated controller 100 and the lower base 30. The lower base 30 may have an upper recess 31 for receiving the bottom cup 2. Then the lower surface 20 of the bottom cup may move on the lower base 30, i.e. tilt and rotate on the lower base 30. The lower base 30 may have an upper surface 310 (for example upper surface 310 of the recess 31) for receiving the bottom cup (2) and for allowing the bottom cup 2 to slide on the lower base 30 and/or the lower surface 20 of the bottom cup 2 may have a surface for allowing the bottom cup 2 to slide on the lower base 30. The lower base may have an outer antiskid bottom surface 32 for preventing the lower base 30 to slide on the ground. In an embodiment, the foot-operated controller 100 may be part of a furniture, for example part of a furniture comprising a seat. The foot-operated controller 100 may be part of a chair or of a sofa or an armchair or others. As concerns the furniture, the seat is attached to the lower base 30 situated lower than the seat.

Other examples of commands involved by the controller 100 are given below.

Figure 12A:
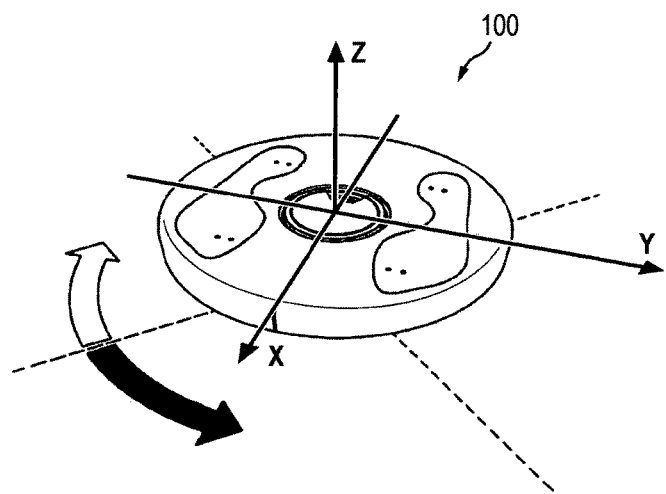
Figure 12B:
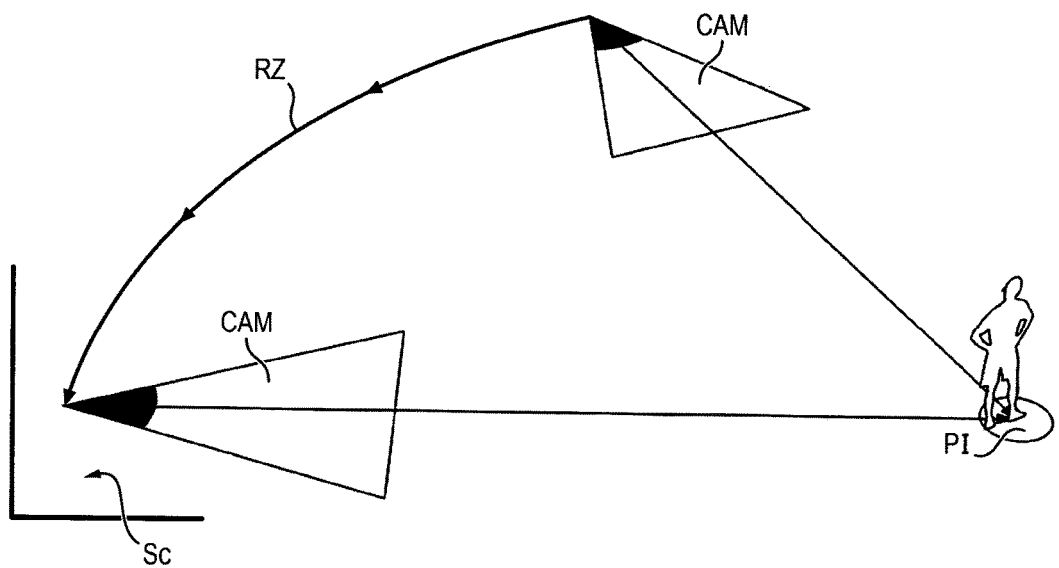

In FIGS. 12A and 12B, rotating the controller 100 around the yaw axis Z according to tilting arrow TZ causes a rotation movement RZ on screen Sc around the point of interest PI (ex. orbit around an object) or around the camera position about a vertical axis Z.

Figure 13A:
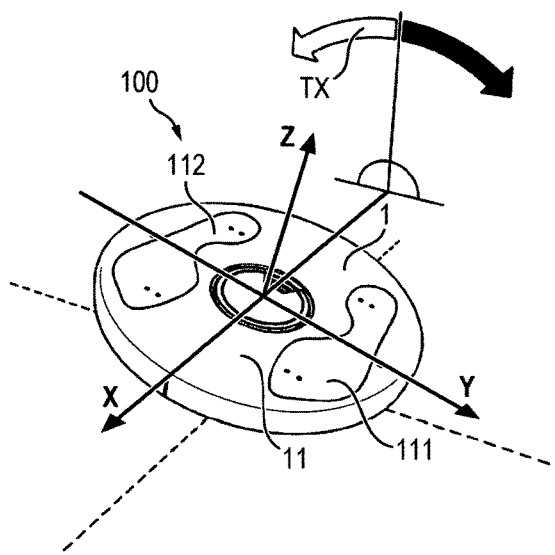
Figure 13B:
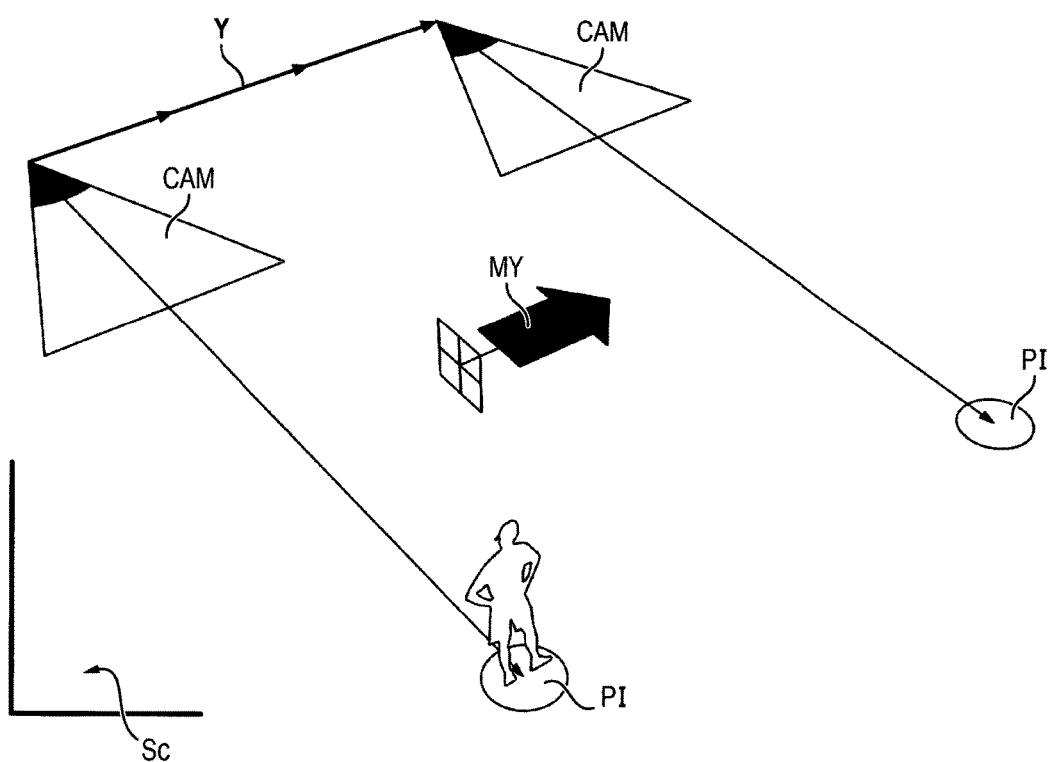

In FIGS. 13A and 13B, the user moves by lateral translation MY along the axis Y to the right or to the left on screen Sc or in virtual environments by tilting, according to tilting arrow TX, the controller 100 to the right or to the left around the second roll axis X (Pan view, right or left).

In FIGS. 14A and 14B, the user moves by longitudinal translation MX along the axis X forward or backward on screen Sc or in virtual environments by tilting, according to tilting arrow TY, the controller 100 forward or backward around the third pitch axis Y (Dolly in or out). The more the tilting the faster it moves.

The larger the amplitude of the movement in any of those axes, the faster the user will move the object she or he is controlling or move in the 3D virtual environment in which she or he is moving.

In FIGS. 16A, 16B, 16C, 16D, a tilting of the controller 100 around the pitch axis Y according to arrow TY combined with a rotation around the yaw axis Z according to arrow TZ causes a lateral movement MY to the right or the left combined with a rotation movement RZ on screen Sc or in virtual environments around the point of interest PI (for example orbit and zoom out) about a vertical axis Z.

In FIGS. 17A, 17B, 17C, 17D, a tilting of the controller 100 around the roll axis X according to arrow TX combined with a rotation around the yaw axis Z according to arrow TZ causes a longitudinal movement MX forwards or backwards combined with a rotation movement RZ on screen Sc or in virtual environments around the point of interest PI (for example orbit and zoom in) about a vertical axis Z.

In FIGS. 18A, 18B, 18C, 18D, a tilting of the controller 100 around the roll axis X according to arrow TX combined with a tilting of the controller 100 around the pitch axis Y according to arrow TY causes a longitudinal movement MX forwards or backwards combined with a lateral movement MY to the right or the left (for example translate and zoom in).

The movements on the screen Sc or in virtual environments described above may be the movement of the point of interest PI (which can be locked or unlocked) and/or of a point of view or of an object or of a remote control or others.

The invention gives the users very precise and natural control. It frees their hands of navigational tasks and let them use them for other actions. It is not limited to tridimensional environment but can also be used in 2D computer environments to move the mouse pointer on the computer screen, to emulate a joystick, or execute commands such as for example forward/rewind or playing music notes or others, with both progressivity and precision.

A non limitative internal structure of the foot-operated controller 100 is described as embodiments below.

The means 7*a* or generator 7*a* are embodied for example in an embedded processing unit (for acquisition of measurements of sensors 7*b* and 6, treatment and transmission). The means 7*a*, 7*b*, 7*c*, 7*d*, 7*e*, CAL can be made in an electronic circuit, for example on one or several electronic board.

In an embodiment, the casing 200 comprises a technical container 8 containing a battery 9. The container 8 is attached to the center of the bottom cup 2. The battery 9 provides the electric energy to the controller 100, i.e. to the means 7*a*, 7*b*, 7*c*, 7*d*, 7*e*, CAL, or electronic card(s), especially in case the controller is connected wirelessly to the machine.

In an embodiment, a wafer 5 supporting the electronic board(s) and the sensors 7*b*, 6 is attached in the casing 200 between the top platform 1 and the bottom cup 2. The AHRS module or the means 7*b* is located on a side of the wafer 5 distant from 7*a* to minimize radio and power interference.

The generator 7a or the means 7a of generation has on an output 7d to transmit the control signals CS to the outside of the foot-operated controller 100. The output 7d or the generator 7a or the means 7a of generation may have an interface 7e, for example a wire communication interface 7e (for example via a USB cable to an external computer, game console, machine or any other electronic device) or wireless communication interface 7e which may comprise a wireless transmitter (for example a radio link, which can be a Bluetooth communication by a Bluetooth adapter, a Wifi communication, a mobile communication or others), for transmitting the control signals CS to the outside of the foot-operated controller 100. The output 7d or interface 7e may be connected to the machine, such as one mentioned above. For example, the generator 7a or means 7a, the means to register 7c, the output 7d and the interface 7e are embodied in a calculator CAL. The calculator CAL is situated between the top platform 1 and the bottom cup 2, i.e. in the casing 200. The calculator CAL comprises a microcontroller, a USB port and may comprise a Bluetooth or RF transmitter. A holder 4 for the optional Bluetooth adapter (to be plugged on the connected computer, machine or electronic unit in case of a wireless connection) may be provided on the technical container 8. The technical container 8 also supports an on/off power button, in order to switch on and off the foot-operated controller 100. A lid 3 may be provided at the middle of the top platform 1. The lid 3 may close the holder 4, letting the on/off power button visible, and can be opened to render the on/off power button accessible from the outside.

A software driver on the machine or computer may be provided to convert the control signals CS received from the controller into data usable by the machine or computer or the game console or a software.

The strength sensors 6 detect the presence of the user's feet and initiate calibration. Calibration is done by measuring the initial pressure on each strength sensor 6, and by collecting the AHRS data.

Dedicated software drivers on the machine to which the controller is connected translate the control signals CS collected into navigation directions and speed, progressive actions, or actions triggered by thresholds values.

Activation of some specific pressure points may be converted into a specific command.

Progressive effects can also be achieved by varying the pressure applied by the feet.

The above embodiments may be taken each alone or may be combined one with another.

The invention claimed is:

1. A foot-operated controller configured to be controlled by a user's feet, comprising:
    a top platform having at least a top surface for receiving the feet,
    a bottom cup having a lower surface of curved convex shape for rotating on its lower surface, wherein the top platform is attached to the bottom cup, so that the top platform carries out the same movement as the bottom cup,
    rotation sensors for measuring rotations of the top platform and/or of the bottom cup about a first yaw axis, a second roll axis and a third pitch axis, which are not coplanar,
    at least one strength sensor for measuring strength applied on the top platform, wherein the rotation sensors and the at least one strength sensor are housed between the top platform and the bottom cup,
    a calculator for generating control signals from the rotations and strength measured by the rotation sensors and the at least one strength sensor, and
    a memory to register an initial rotation position of the top platform and/or of the bottom cup measured by the rotation sensors relative to at least one of the first yaw axis, second roll axis and third pitch axis upon the at least one strength sensor measuring a strength representative of the presence of the feet on the top platform,
    wherein the initial rotation position corresponds to a rest position of the feet on the top platform when the user is sitting, and wherein the user's feet being positioned on the top platform causes the top platform to be inclined by at least an initial angle to the rear about the third pitch axis relative to an horizontal position of the top platform, wherein the initial angle is not null,
    wherein the control signals are generated to have an amplitude taken relative to a zero position which remains constant as the user moves his feet to tilt the bottom cup relative to the initial rotation position during use of the foot-operated controller until restart of the foot-operated controller, the zero position corresponding to the initial rotation position and/or to the initial angle.

2. The foot-operated controller according to claim 1, wherein the initial angle of the top platform to the rear under the horizontal position about the third pitch axis is strictly greater than 0° and lower than or equal to 20°.

3. The foot-operated controller according to claim 1, wherein the top surface has a left engraved footprint and/or a right engraved footprint.

4. The foot-operated controller according to claim 3, wherein the at least one strength sensor is located under the left engraved footprint and/or the right engraved footprint.

5. The foot-operated controller according to claim 1, wherein the at least one strength sensor comprises:
    a first strength sensor and a second strength sensor placed under respectively a first point of the top platform and a second point of the top platform distant from the first point along the second roll axis.

6. The foot-operated controller according to claim 5, wherein the at least one strength sensor comprises at least a third strength sensor placed under a further point of the top platform, which is distant from the first point and from the second point.

7. The foot-operated controller according to claim 1, wherein the at least one strength sensor comprises:
    a third strength sensor and a fourth strength sensor placed under respectively a third point of the top platform and a fourth point of the top platform distant from the third point along the third pitch axis.

8. The foot-operated controller according to claim 1, wherein the at least one strength sensor comprises a plurality of strength sensors distributed around a vertical axis, wherein the distance between the strength sensors is smaller than the size of an adult foot.

9. The foot-operated controller according to claim 8, wherein the distance between the points is smaller than 30 cm.

10. The foot-operated controller according to claim 1, wherein the lower surface of the bottom cup is of revolution around a vertical axis.

11. The foot-operated controller according to claim 1, wherein the lower surface of the bottom cup has an outer antiskid surface for preventing the bottom cup to slide.

12. The foot-operated controller according to claim 1, wherein the initial rotation position and/or the rest position and/or the reference and/or the initial angle corresponds to an immobile position of a physical or virtual object, a moving of which from the immobile position is driven by the control signals or a speed of which from the immobile position is driven by the control signals.

13. The foot-operated controller according to claim 1, wherein the calculator is further configured to determine the second roll axis and/or the third pitch axis from the initial rotation position having been registered and corresponding to the initial angle to the rear, having been measured by the rotation sensors or from a specific predefined movement around one of the second roll axis or the third pitch axis, for example tilting to the front then to the rear just before moving to the initial position corresponding to the rest position.

14. A device comprising the foot-operated controller according to claim 1, wherein the device further comprises a lower base separated from the bottom cup and provided for supporting the bottom cup and for allowing rotations of the bottom cup about the first yaw axis, the second roll axis and the third pitch axis.

15. The device according to claim 14, wherein the lower base has an upper recess for receiving the bottom cup.

16. The device according to claim 14, wherein the lower base has an upper surface for receiving the bottom cup and for allowing the bottom cup to slide on the lower base and/or the lower surface of the bottom cup has a surface for allowing the bottom cup to slide on the lower base.

17. The device according to claim 14, wherein the lower base has an outer bottom antiskid surface for preventing the lower base to slide.

18. Furniture, comprising a seat attached to a lower base situated lower than the seat, and the foot-operated controller according to claim 1, wherein the lower base is separated from the bottom cup of the foot-operated controller and is provided for supporting the bottom cup and for allowing rotations of the bottom cup about the first yaw axis, the second roll axis and the third pitch axis.

19. A method of operating the foot-operated controller according to claim 1, the method comprising:
    a user puts his two feet on the top platform of the foot-operated controller,
    then the at least one strength sensor measures a strength exerted on the top platform,
    then an initial rotation position of the top platform and/or of the bottom cup relative to at least one of the first yaw axis, second roll axis and third pitch axis is measured by the rotation sensors and/or an initial force is measured by the at least one strength sensor, in response to the fact that the strength measured by the at least one strength sensor is representative of the presence of the feet on the top platform,
    wherein the initial rotation position and/or the initial force corresponds to a rest position and/or rest force of the feet on the top platform when the user is sitting and wherein the user's feet being positioned on the top platform causes the top platform to be inclined by an initial angle to the rear about the third pitch axis relative to an horizontal position of the top platform, wherein the initial angle is not null,
    then the at least one strength sensor measures a strength exerted on the top platform and the rotation sensors measure rotations of the top platform and/or of the bottom cup about the first yaw axis, the second roll axis and the third pitch axis, so that the control signals are generated depending of the strength and rotations measured to have an amplitude taken relative to a zero position which remains constant as the user moves his feet to tilt the bottom cup relative to the initial rotation position during use of the foot-operated controller until restart of the foot-operated controller, the zero position corresponding to the initial rotation position and/or to the initial angle.

20. A method of operating the device according to claim 14, wherein
    a user puts his two feet on the top platform of the foot-operated controller,
    then the at least one strength sensor measures a strength exerted on the top platform,
    then an initial rotation position of the top platform and/or of the bottom cup relative to at least one of the first yaw axis, second roll axis and third pitch axis is measured by the rotation sensors and/or an initial force is measured by the at least one strength sensor, in response to the fact that the strength measured by the at least one strength sensor is representative of the presence of the feet on the top platform,
    wherein the initial rotation position and/or the initial force corresponds to a rest position and/or rest force of the feet on the top platform when the user is sitting and wherein the user's feet being positioned on the top platform causes the top platform to be inclined by an initial angle to the rear about the third pitch axis relative to an horizontal position of the top platform, wherein the initial angle is not null,
    then the at least one strength sensor measures a strength exerted on the top platform and the rotation sensors measure rotations of the top platform and/or of the bottom cup about the first yaw axis, the second roll axis and the third pitch axis, so that the control signals are generated depending of the strength and rotations measured to have an amplitude taken relative to a zero position which remains constant as the user moves his feet to tilt the bottom cup relative to the initial rotation position during use of the foot-operated controller until restart of the foot-operated controller, the zero position corresponding to the initial rotation position and/or to the initial angle.

21. The foot-operated controller according to claim 6, wherein the at least one strength sensor comprises:
    a third strength sensor and a fourth strength sensor placed under respectively a third point of the top platform and a fourth point of the top platform distant from the third point along the third pitch axis.

22. A foot-operated controller configured to be controlled by a user's feet, comprising
    a top platform having at least a top surface for receiving the feet,
    a bottom cup having a lower surface of curved convex shape for rotating on its lower surface, wherein the top platform is attached to the bottom cup, so that the top platform carries out the same movement as the bottom cup,
    rotation sensors for measuring rotations of the top platform and/or of the bottom cup about a first yaw axis, a second roll axis and a third pitch axis, which are not coplanar,
    wherein the foot-operated controller further comprises at least one strength sensor for measuring strength applied on the top platform, wherein the rotation sensors and the at least one strength sensor are housed between the top platform and the bottom cup, a calculator for generating control signals from the rotations and strength measured by the rotation sensors and the at least one strength sensor,
a memory to register an initial force measured by the at least one strength sensor upon the at least one strength sensor measuring a strength representative of the presence of the feet on the top platform,
wherein the initial force corresponds to a rest force of the feet on the top platform when the user is sitting, and wherein the user's feet being positioned on the top platform causes the top platform to be inclined by at least an initial angle to the rear about the third pitch axis relative to an horizontal position of the top platform, wherein the initial angle is not null,
wherein the control signals have an amplitude taken relative to a zero position which remains constant as the user moves his feet to tilt the bottom cup relative to the initial angle during use of the foot-operated controller until restart of the foot-operated controller, the zero position corresponding to the initial angle.

* * * * *